(12) United States Patent
Yao

(10) Patent No.: US 12,442,171 B2
(45) Date of Patent: Oct. 14, 2025

(54) SEAT ASSEMBLY, A SEAT DEVICE, A BODY CLEANING SYSTEM, A SEAT DEVICE FOR A TOILET, A PRE-FLUSH SYSTEM, AND A TOILET

(71) Applicant: Kohler (China) Investment Co., Ltd., Shanghai (CN)

(72) Inventor: Pingsheng Yao, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 272 days.

(21) Appl. No.: 18/225,978

(22) Filed: Jul. 25, 2023

(65) Prior Publication Data
US 2024/0044121 A1    Feb. 8, 2024

(30) Foreign Application Priority Data

Aug. 3, 2022  (CN) .......................... 202210926066.8
Aug. 3, 2022  (CN) .......................... 202222036209.6
Aug. 3, 2022  (CN) .......................... 202222036216.6
Aug. 3, 2022  (CN) .......................... 202222036463.6

(51) Int. Cl.
*E03D 9/08* (2006.01)
*A47K 13/24* (2006.01)
*F16K 11/00* (2006.01)
*F16K 24/04* (2006.01)

(52) U.S. Cl.
CPC ................ *E03D 9/08* (2013.01); *A47K 13/24* (2013.01); *F16K 19/00* (2013.01); *F16K 24/04* (2013.01)

(58) Field of Classification Search
CPC ....................................................... E03D 9/08
See application file for complete search history.

(56) References Cited

U.S. PATENT DOCUMENTS

| 5,647,069 A * | 7/1997 | Han .......................... E03D 9/08 |
| | | 4/420.4 |
| 2008/0134423 A1* | 6/2008 | Ding ........................ E03D 9/08 |
| | | 4/420.2 |

FOREIGN PATENT DOCUMENTS

| CN | 104099984 A | 10/2014 | |
| CN | 105962831 A | 9/2016 | |
| CN | 107268745 A * | 10/2017 | ............... E03D 9/00 |

(Continued)

OTHER PUBLICATIONS

Chinese Office Action from Chinese Patent Application No. 202210926066.8, dated Jun. 22, 2023, 5 pages. (including English summary).

*Primary Examiner* — Christine J Skubinna
(74) *Attorney, Agent, or Firm* — Lempia Summerfield Katz LLC

(57) ABSTRACT

A seat device includes a seat base, including a cold water inlet end and a hot water inlet end. The seat device further includes a spray pipe, including an inlet end. The seat device further includes a temperature control system configured to generate water having a predetermined temperature by mixing cold water and hot water. The temperature control system includes an inlet end connected to the cold water inlet end of the seat base and the hot water inlet end of the seat base and includes an outlet end connected to the inlet end of the spray pipe. The seat device further includes a pre-flush system, including an inlet end connected to the hot water inlet end or the outlet end of the temperature control system and including an outlet end connected to the inlet end of the spray pipe.

20 Claims, 17 Drawing Sheets

(56) References Cited

FOREIGN PATENT DOCUMENTS

| | | |
|---|---|---|
| CN | 208784583 U | 4/2019 |
| CN | 211381064 U | 9/2020 |
| CN | 213248809 U | 5/2021 |
| FR | 2883726 A1 | 10/2006 |

* cited by examiner

SEAT ASSEMBLY, A SEAT DEVICE, A BODY CLEANING SYSTEM, A SEAT DEVICE FOR A TOILET, A PRE-FLUSH SYSTEM, AND A TOILET

CROSS REFERENCE TO RELATED APPLICATION

This application claims the benefit of priority to: Chinese Patent Application No. 202222036209.6 filed in the Chinese Intellectual Property Office on Aug. 3, 2022, which is hereby incorporated by reference in its entirety; Chinese Patent Application No. 202210926066.8 filed in the Chinese Intellectual Property Office on Aug. 3, 2022, which is hereby incorporated by reference in its entirety; Chinese Patent Application No. 202222036216.6 filed in the Chinese Intellectual Property Office on Aug. 3, 2022, which is hereby incorporated by reference in its entirety; and Chinese Patent Application No. 202222036463.6 filed in the Chinese Intellectual Property Office on Aug. 3, 2022, which is hereby incorporated by reference in its entirety.

FIELD

The present disclosure relates to the technical field of sanitary toilet, and particularly to a seat device and a toilet. The present disclosure relates to the technical field of sanitary ware, especially relates to a seat assembly and toilet. The present disclosure relates to the technical field of sanitary toilet, and particularly relates to a body cleaning system and seat device for toilet and toilet. The present disclosure relates to the technical field of toilet flushing system, and particularly relates to a pre-flush system and a toilet.

BACKGROUND

Requirements for sanitary products increases with the improvement of people's living standard. The smart toilet with a cleaning function meets the user's hygiene needs and is used more and more widely.

The smart toilet cleans the user's private part by spraying water, and the water required is warm.

The existing smart toilet uses an electric heating device to instantly heat cold water, it is not satisfactory in maintaining the water temperature, and the water temperature changes a lot, leading to bad user experience.

The existing smart toilet lacks a pre-flush function, and the water in the spray pipe has turned into cool water when the user uses it next time, also affecting the user experience.

In view of this, it is necessary to provide a seat device and a toilet with a constant temperature function and a pre-flush function.

The toilet comprises a ceramic body and a seat and lid assembly, the seat and lid assembly comprises a seat lid and a seat mounted on a mounting base by a pivot, and the mounting base is mounted at a rear of the ceramic body.

In the toilet in the prior art, the pivot may only be rotated on the mounting base, and cannot be adjusted vertically. After the seat and lid assembly is placed on the ceramic body, the seat is in contact with the ceramic body. The user sitting on the seat experiences direct hard contact between the seat and ceramic body, which lack of cushion.

In view of this, it is necessary to provide a new type of seat assembly and toilet.

Requirements for functions of a toilet increases with the improvement of the people's living standard, resulting in the derivation of a smart toilet. The smart toilet has a seat heating function, spray water flushing function, remote control function, etc. The smart toilet can clean the user's private part when executing the spray water flushing function. Therefore, when performing the spray water flushing function, flushing with warm water can improve the user's flushing comfort.

The existing smart toilets are usually connected to cold water alone, and then the cold water is heated by an internal heater to provide warm water for the spray pipe. The heating method adopted by the heater is mostly instant fast heating, which has high power consumption, is not convenient to control temperature, and prone to sudden hot and sudden cold phenomenon.

In view of this, it is necessary to provide a body cleaning system and seat device for toilet and toilet with good temperature control and power saving.

The smart toilet is equipped with a flushing system, comprising a spray pipe/nozzle and a water supply system. When user needs to use it, the spray pipe/nozzle extends and sprays water to flush the user's private part.

There is water in the spray pipe/nozzle for a long time. When the user uses it, the water in the spray pipe/nozzle has turned into cold water, which affects the user's sense of experience.

In view of this, it is necessary to provide a pre-flush system and a toilet for pre-draining cold water from the spray pipe/nozzle.

SUMMARY

The present disclosure aims to overcome the defects in the prior art, and provides a seat device and a toilet with a constant temperature function and a pre-flush function.

A technical solution of the present disclosure provides a seat device comprises a seat base having a cold water inlet end and a hot water inlet end, a seat pivotably mounted on the seat base, and a spray pipe, a temperature control system, and a pre-flush system assembled with the seat and/or the seat base;

an inlet end of the temperature control system is in communication with the cold water inlet end and the hot water inlet end, respectively, an outlet end of the temperature control system is in communication with an inlet end of the spray pipe;

an inlet end of the pre-flush system is in communication with the hot water inlet end or the outlet end of the temperature control system, an outlet end of the pre-flush system is in communication with the inlet end of the spray pipe.

In an embodiment, the inlet end of the spray pipe comprises a main inlet end and a pre-flush inlet end, the temperature control system is in communication with the main inlet end and the pre-flush system is in communication with the pre-flush inlet end.

In an embodiment, the temperature control system comprises a temperature control valve and a temperature control system water valve; and an inlet end of the temperature control valve is in communication with the cold water inlet end and the hot water inlet end, respectively, and an outlet end of the temperature control valve is in communication with an inlet end of the temperature control system water valve, and an outlet end of the temperature control system water valve is in communication with the inlet end of the spray pipe.

In an embodiment, the temperature control system water valve comprises a water mixing valve and a spray pipe conversion valve; and
an outlet of the temperature control valve is in communication with a hot water inlet of the water mixing valve, a cold water supply end is in communication with a cold water inlet of the water mixing valve, an outlet of the water mixing valve is in communication with an inlet of the spray pipe conversion valve, and an outlet of the spray pipe conversion valve is in communication with the inlet end of the spray pipe.

In an embodiment, the temperature control system water valve comprising a waterway adapter valve having a hot water pipeline and a cold water pipeline;
an inlet of the hot water pipeline is in communication with the outlet of the temperature control valve, an outlet of the hot water pipeline is in communication with the hot water inlet of the water mixing valve; and
an inlet of the cold water pipeline is in communication with the cold water supply end, an outlet of the cold water pipeline is in communication with the cold water inlet of the water mixing valve.

In an embodiment, the pre-flush system comprises a drain valve;
the drain valve comprises a drain valve inlet pipe, a drain valve outlet pipe and a drain valve diaphragm for controlling opening and closing of the drain valve outlet pipe;
the drain valve inlet pipe is in communication with the hot water inlet end and the drain valve outlet pipe is in communication with the inlet end of the spray pipe;
the pre-flush system further comprises a control mechanism for controlling opening and closing of the drain valve diaphragm;
when the control mechanism is in an initial state, the drain valve diaphragm is in a closed state; and
when the control mechanism is in a triggered state, the drain valve diaphragm is in an opened state.

In an embodiment, the seat is connected to the seat base through a pivot shaft, and the pivot shaft is adjustable by moving up and down relative to the seat base;
a reset mechanism is assembled between the seat base and the pivot shaft for driving the pivot shaft to move upward to reset;
the control mechanism comprises a first trigger end, the pivot shaft being provided with a second trigger end for triggering the first trigger end;
when the seat is in an initial position, the first trigger end is in an initial state; and when the seat is in a descending position, the second trigger end triggers the first trigger end and causes the control mechanism in the triggered state.

In an embodiment, the seat base has a guide groove extending vertically, the second trigger end being in clearance fit (e.g., engaged) with the guide groove; and
the first trigger end is kept in contact with the second trigger end and is capable of being pressed down by the second trigger end to a triggered position.

In an embodiment, the drain valve further comprises a drain valve pressure relief pipe, the control mechanism being connected to the drain valve pressure relief pipe;
when the control mechanism is in the initial state, the drain valve pressure relief pipe is in a stopping draining state; and
when the control mechanism is in the triggered state, the drain valve pressure relief pipe is in a draining state.

In an embodiment, the control mechanism comprises a water storage valve having a water storage cavity;
the water storage valve is connected with a water storage valve inlet pipe and a water storage valve drain pipe which are in communication with the water storage cavity, the water storage valve inlet pipe is provided with an inlet control valve, and the water storage valve drain pipe is provided with a drain control valve;
the water storage valve inlet pipe is in communication with the drain valve pressure relief pipe;
when the control mechanism is in the initial state, the inlet control valve is in a closed state and the drain control valve is in an opened state; and
when the control mechanism is in the triggered state, the inlet control valve is in an opened state and the drain control valve is in a closed state.

In an embodiment, the control mechanism further comprises a switching valve connected to the water storage valve inlet pipe and the water storage valve drain pipe;
the switching valve comprises a switching valve housing having a channel and a switching shaft in clearance fit (e.g., engaged) with the channel;
the switching shaft is capable of alternately triggering the drain control valve and the inlet control valve;
when the switching shaft is in an initial position, the switching shaft triggers the drain control valve, and the drain control valve is in the opened state; and
when the switching shaft is in a triggered position, the switching shaft triggers the inlet control valve, and the inlet control valve is in the opened state.

In an embodiment, the inlet control valve comprises a first slide valve and a first reset member for driving the first slide valve to reset to a closed state;
the drain control valve comprises a second slide valve and a second reset member for driving the second slide valve to reset to a closed state;
when the switching shaft is in the initial position, the first slide valve is in a closed state and the second slide valve is driven to open by the switching shaft; and
when the switching shaft is in the triggered position, the second slide valve is in a closed state, and the first slide valve is driven to open by the switching shaft.

In an embodiment, the switching shaft is provided at intervals with a first recess for accommodating an end portion of the first slide valve and a second recess for accommodating an end portion of the second slide valve;
when the switching shaft is in the initial position, one end of the first slide valve is in the first recess and one end of the second slide valve is in contact with a circumferential surface of the switching shaft; and
when the switching shaft is in the triggered position, one end of the second slide valve is in the second recess and one end of the first slide valve is in contact with the circumferential surface of the switching shaft.

In an embodiment, the water storage valve inlet pipe comprises a first inlet pipe and a second inlet pipe;
the first inlet pipe communicates the drain valve pressure relief pipe to the first recess and the second inlet pipe communicates the water storage cavity to the first recess; and
the inlet control valve is in the first inlet pipe or in the second inlet pipe.

In an embodiment, the water storage valve drain pipe comprises a first drain pipe and a second drain pipe;
the first drain pipe is connected to the switching valve housing and in communication with the second recess, the second drain pipe communicates the water storage cavity to the second recess; and the drain control valve is in the first drain pipe or in the second drain pipe.

In an embodiment, the water storage cavity comprises a lower water storage cavity and an upper water storage cavity, a partition between said lower water storage cavity and the upper water storage cavity having a partition through hole;

the water storage valve inlet pipe and the water storage valve drain pipe are in communication with the lower water storage cavity, respectively;

the lower water storage cavity has a floating valve for opening and closing the partition through hole, the upper water storage cavity is provided with a water float, a connecting rod is connected between the floating valve and the water float, and the connecting rod passes through the partition through hole with a clearance therebetween; and the floating valve closes the partition through hole when water stored in the upper water storage cavity reaches a predetermined water level.

A technical solution of the present disclosure further provides a toilet, which comprises the seat device according to any one of the technical solutions above.

By adopting the technical solutions above, the present disclosure has the following beneficial effects.

According to the seat device and toilet provided by the present disclosure, cold water and hot water are supplied to the temperature control system by the cold water inlet end and hot water inlet end respectively, and then water temperature is adjusted to a preset temperature by the temperature control system to achieve a constant temperature effect, and the warm water is output to the spray pipe for flushing, which enhances the user experience.

According to the seat device and toilet provided by the present disclosure, when using the toilet, the user may enable the pre-flush system as needed before flushing with the spray pipe, the warm water from the pre-flush system flows into the spray pipe to pre-flush out the cold water in the spray pipe, the cold water flushed out can be discharged into the ceramic cylinder of the toilet and play a cleaning role, and when the user uses the spray pipe later, the water sprayed from the spray pipe is basically warm water, which further enhances the user experience.

In sum, the present disclosure provides a seat device and a toilet seat with a constant temperature function and a pre-flush function, which is conducive to enhancing the user experience and improving the performance of the product.

The present disclosure aims to overcome the defects in the prior art and provides a seat assembly with a cushion function and a toilet.

A technical solution of the present disclosure provides a seat assembly, comprising a mounting base and a seat, wherein the seat is connected to the mounting base by a pivot shaft;

an adjustment hole is provided on the left and right sides of a housing of the mounting base respectively;

the pivot shaft passes through the adjustment hole and can be adjusted vertically in the adjustment hole; and a reset mechanism is assembled between the mounting base and the pivot shaft for driving the pivot shaft to move upward to reset.

In an embodiment, the adjustment hole is a waist-shaped hole extending along the vertical direction.

In an embodiment, the mounting base has a mounting cavity and the reset mechanism is in the mounting cavity.

In an embodiment, the reset mechanism comprises a slider and an elastic member;

the slider is assembled in the mounting cavity and is capable of sliding up and down in the mounting cavity; and the elastic member is connected to the slider and is capable of driving the slider to slide upward to reset.

In an embodiment, the mounting cavity has a guide member extending vertically, and the slider is slidingly connected to the guide member.

In an embodiment, the guide member comprises at least one guide column;

the slider has an assembly hole for fitting with the guide column; and the guide column is in clearance fit (e.g., engaged) with the assembly hole.

In an embodiment, the elastic member is a spring, the spring being sleeved onto the guide column.

In an embodiment, a hole wall of the assembly hole has a step portion for connecting one end of the spring, and one end of the guide column has a pad plate for connecting the other end of the spring.

In an embodiment, the guide column is connected to a top plate of the mounting base and extends downwards, the assembly hole runs through upper and lower surfaces of the slider, and the guide column is inserted into the assembly hole from a top opening of the assembly hole.

A technical solution of the present disclosure provides a toilet, comprising a toilet body and the seat assembly according to any one of the technical solutions above, the mounting base being mounted at a rear of the toilet body.

By adopting the technical solutions above, the present disclosure has the following beneficial effects:

According to the seat assembly and toilet provided by the present disclosure, the seat may be adjusted vertically relative to the mounting base, the seat may be driven by the reset mechanism such that the seat resets, and the seat has a drop process when the user sits on the seat, thus having a cushion function, and enhancing the user experience.

The present disclosure aims to overcome the defects in the prior art, and provides a body cleaning system and seat device for toilet and toilet with good temperature control and power saving.

A technical solution of the present disclosure provides a body cleaning system for a toilet, comprising a cold water supply end, a hot water supply end, a temperature control valve, a water valve and a spray pipe;

a first cold water outlet of the cold water supply end is in communication with a cold water inlet of the temperature control valve, and a hot water outlet of the hot water supply end is in communication with a hot water inlet of the temperature control valve;

an outlet of the temperature control valve is in communication with an inlet of the water valve, an outlet of the water valve is in communication with an inlet of the spray pipe.

In an embodiment, the temperature control valve is a mechanical temperature control valve with a constant temperature.

In an embodiment, the temperature control valve is a temperature controlled adjusting valve capable of adjusting temperature.

In an embodiment, the water valve comprises a water mixing valve and a switching valve; and the outlet of the temperature control valve is in communication with a hot water inlet of the water mixing valve, a second cold water outlet of the cold water supply end is in communication with a cold water inlet of the water mixing valve, an outlet of the water mixing valve is in communication with an inlet of the switching valve, and an outlet of the switching valve is in communication with the inlet of the spray pipe.

In an embodiment, the water valve further comprises a waterway adapter valve having a hot water pipeline and a cold water pipeline;

an inlet of the hot water pipeline is in communication with the outlet of the temperature control valve, an outlet of the hot water pipeline is in communication with the hot water inlet of the water mixing valve; and an inlet of the cold water pipeline is in communication with the second cold water outlet of the cold water supply end, an outlet of the cold water pipeline is in communication with the cold water inlet of the water mixing valve.

In an embodiment, the spray pipe comprises a front spray pipe and/or a rear spray pipe; and the front spray pipe and/or the rear spray pipe are each connected to the outlet of the water valve through a water pipe.

A technical solution of the present disclosure also provides a seat device comprising a mounting base having a mounting cavity, a seat pivotally mounted on the mounting base and the body cleaning system for a toilet according to any one of the technical solutions;

the cold water supply end, the hot water supply end and the temperature control valve are respectively mounted in the mounting cavity; and the water valve is assembled with the seat and/or the mounting base and the spray pipe is assembled with the seat and/or the mounting base.

In an embodiment, the spray pipe comprises a front spray pipe and/or a rear spray pipe; and the front spray pipe is assembled in a front end of the seat and the rear spray pipe is assembled in the mounting cavity.

In an embodiment, a front of the mounting base has a guide groove for guiding a nozzle of the rear spray pipe to extend obliquely downwards.

A technical solution of the present disclosure also provides a toilet, comprising a toilet body and the seat device according to any one of the technical solutions, the mounting base is mounted at a rear of the toilet body.

By adopting the technical solutions above, the present disclosure has the following beneficial effects:

According to the body cleaning system and seat device for toilet and the toilet provided by the present disclosure, the cold water supply end and the hot water supply end supply cold water and hot water to the temperature control valve respectively, and then the temperature control valve adjusts the water temperature to a preset temperature to achieve a constant temperature effect, and warm water is output from the water valve to the spray pipe for flushing.

The present disclosure provides the body cleaning system and seat device for toilet and the toilet, which do not need to be equipped with a heater, saving electricity, wherein the temperature control valve is adjusted with a constant temperature function and good temperature control effect, improving the user experience.

The present disclosure aims to overcome the defects in the prior art and provides a pre-flush system and a toilet for pre-draining the cold water from the spray pipe/nozzle.

A technical solution of the present disclosure provides a pre-flush system comprising a spray pipe and a drain valve, wherein, the drain valve has a drain valve inlet pipe for connection with a hot water inlet end, and a drain valve outlet pipe for supplying hot water to the spray pipe;

the drain valve has a drain valve diaphragm for controlling opening and closing of the drain valve outlet pipe;

the drain valve outlet pipe is connected to the spray pipe;

the pre-flush system further comprises a control mechanism for controlling opening and closing of the drain valve diaphragm;

when the control mechanism is in an initial state, the drain valve diaphragm is in a closed state; and when the control mechanism is in a triggered state, the drain valve diaphragm is in an opened state.

In an embodiment, the drain valve further comprises a drain valve pressure relief pipe, the control mechanism is connected to the drain valve pressure relief pipe;

when the control mechanism is in the initial state, the drain valve pressure relief pipe is in a stopping drainage state; and when the control mechanism is in the triggered state, the drain valve pressure relief pipe is in a draining state.

In an embodiment, the control mechanism comprises a water storage valve having a water storage cavity;

the water storage valve is connected with a water storage valve inlet pipe and a water storage valve drain pipe in communication with the water storage cavity, the water storage valve inlet pipe is provided with an inlet control valve and the water storage valve drain pipe is provided with a drain control valve;

the water storage valve inlet pipe is in communication with the drain valve pressure relief pipe;

when the control mechanism is in the initial state, the inlet control valve is in a closed state and the drain control valve is in an opened state; and when the control mechanism is in the triggered state, the inlet control valve is in an opened state and the drain control valve is in a closed state.

In an embodiment, the control mechanism further comprises a switching valve connected to the water storage valve inlet pipe and the water storage valve drain pipe;

the switching valve comprises a switching valve housing having a channel and a switching shaft in clearance fit (e.g., engaged) with the channel;

the switching shaft is capable of alternately triggering the drain control valve and the inlet control valve;

when the switching shaft is in an initial position, the switching shaft triggers the drain control valve, the drain control valve being in the opened state; and when the switching shaft is in a triggered position, the switching shaft triggers the inlet control valve, the inlet control valve being in the opened state.

In an embodiment, a switching shaft reset member is connected between the switching valve housing and the switching shaft for driving the switching shaft to reset to the initial position.

In an embodiment, the inlet control valve comprises a first slide valve and a first reset member for driving the first slide valve to reset to a closed state;

the drain control valve comprises a second slide valve and a second reset member for driving the second slide valve to be reset to a closed state;

when the switching shaft is in the initial position, the first slide valve is in the closed state, and the second slide valve is driven to open by the switching shaft; and when the switching shaft is in the triggered position, the second slide valve is in the closed state, and the first slide valve is driven to open by the switching shaft.

In an embodiment, the switching shaft is provided at intervals with a first recess for accommodating an end portion of the first slide valve and a second recess for accommodating an end portion of the second slide valve;

when the switching shaft is in the initial position, one end of the first slide valve is in the first recess and one end of the second slide valve is in contact with a circumferential surface of the switching shaft; and when the switching shaft is in the triggered position, one end of the second slide valve is in the second recess, and one end of the first slide valve is in contact with the circumferential surface of the switching shaft.

In an embodiment, the water storage valve inlet pipe comprises a first inlet pipe and a second inlet pipe;

the first inlet pipe communicates the drain valve pressure relief pipe to the first recess and the second inlet pipe communicates the water storage cavity to the first recess; and the inlet control valve is in the first inlet pipe or in the second inlet pipe.

In an embodiment, the water storage valve drain pipe comprises a first drain pipe and a second drain pipe;

the first drain pipe is connected to the switching valve housing and in communication with the second recess, the second drain pipe communicates the water storage cavity to the second recess; and the drain control valve is in the first drain pipe or in the second drain pipe.

In an embodiment, a seal ring is provided on both sides of the first recess and on both sides of the second recess on the switching shaft respectively.

In an embodiment, a top plate of the water storage cavity has a water storage cavity drainage hole, the water storage cavity has a floating valve for opening and closing the water storage cavity drainage hole; and when water stored in the water storage cavity reaches a predetermined water level, the floating valve closes the water storage cavity drainage hole.

In an embodiment, the water storage valve further comprises a water tank located above the water storage cavity, the water tank being provided with a water float; and a connecting rod is connected between the floating valve and the water float and the connecting rod passes through the water storage cavity drainage hole with a clearance therebetween.

In an embodiment, a side of the water tank has an overflow pipe.

A technical solution of the present disclosure further provides a toilet, which comprises the pre-flush system according to any one of the technical solutions above.

By adopting the technical solutions above, the present disclosure has the following beneficial effects:

According to the pre-flush system and toilet provided by the present disclosure, when using the toilet, the user can trigger the control mechanism as needed before flushing with the spray pipe, the warm water in the drain valve flows into the spray pipe to pre-flush out the cold water in the spray pipe, the cold water flushed out can be drained into the ceramic cylinder of the toilet and play a cleaning role, and when the user uses the spray pipe later, the water sprayed from the spray pipe is basically warm water, which enhances the user's sense of experience.

BRIEF DESCRIPTION OF THE FIGURES

With reference to the drawings, the contents disclosed by the present disclosure should be more easily understood. It should be understood that: these drawings are merely used for illustration and are not intended to limit the protection scope of the present disclosure. In the drawings.

DETAILED DESCRIPTION

Embodiment 1

Figure 1:
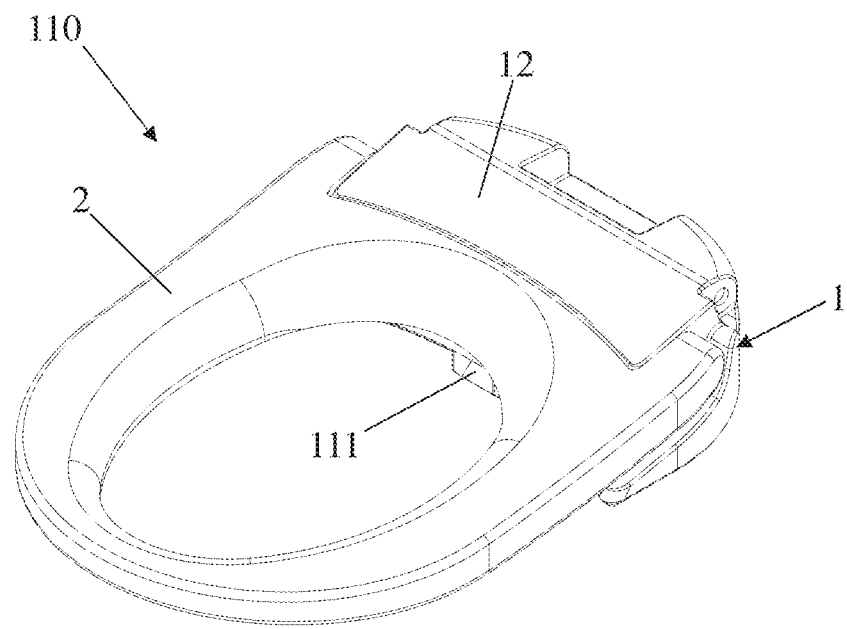
FIG. 1 is a stereoscopic view of a seat device provided in an embodiment of the present disclosure.

The specific embodiments of the present disclosure are further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
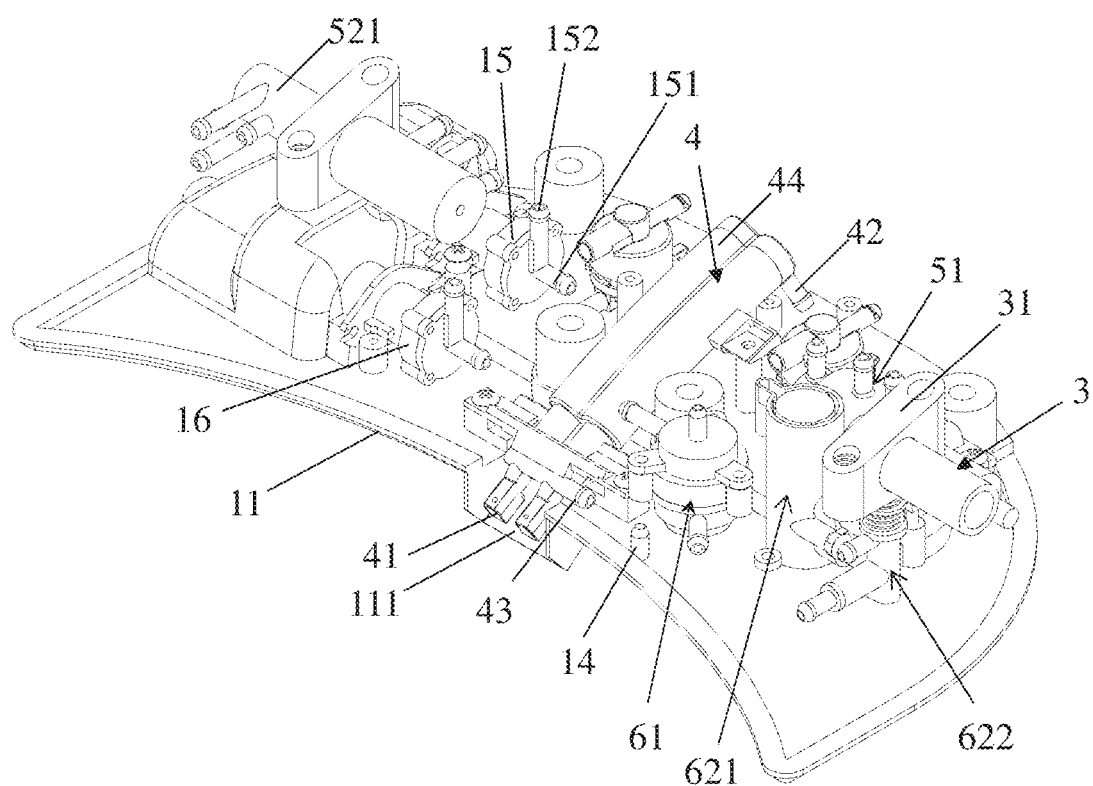
FIG. 2 is a schematic diagram of a spray pipe, a temperature control system, and a pre-flush system mounted on a base plate of a seat base.
Figure 3:
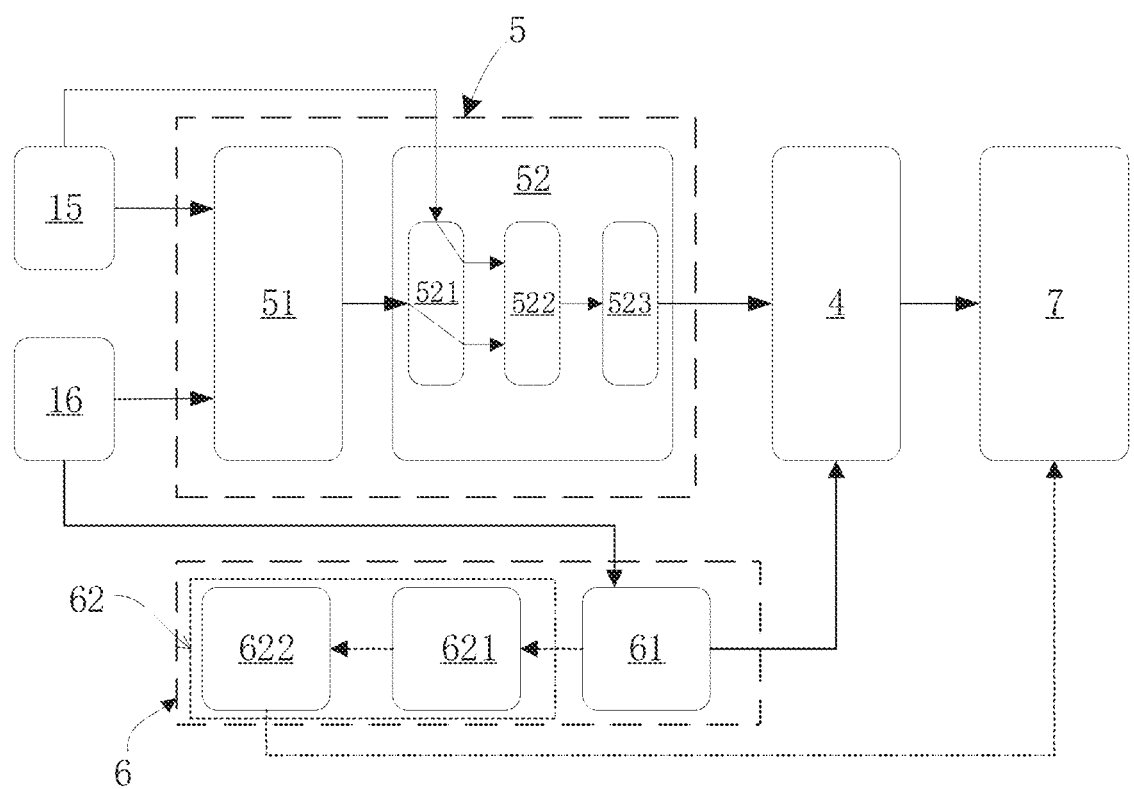
FIG. 3 is a relationship diagram of a waterway of the spray pipe, the temperature control system and the pre-flush system.
Figure 4:
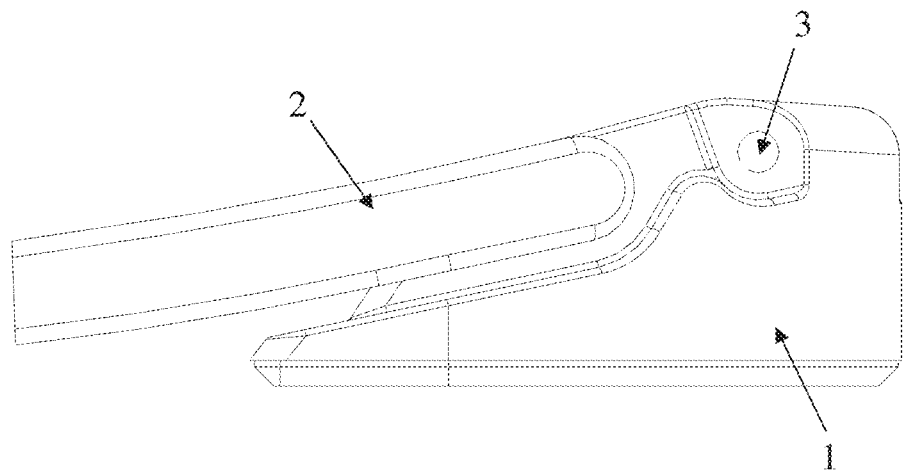
FIG. 4 is a partial side view of the seat device when a seat is in an initial state.
Figure 5:
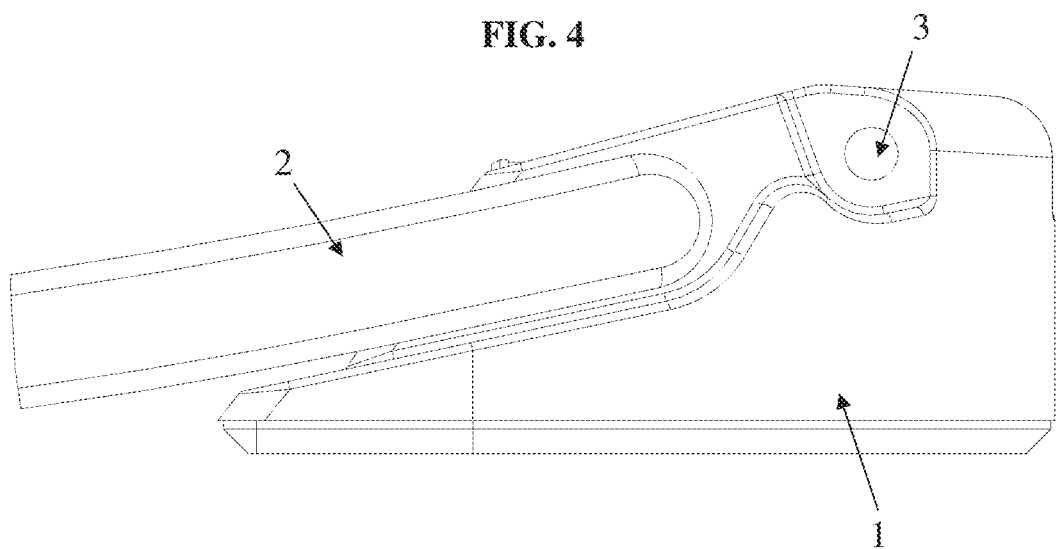
FIG. 5 is a partial side view of the seat device when the seat is in a descending state.

As shown in FIGS. 1-3, a seat device provided by an embodiment of the present disclosure comprises a seat base 1 having a cold water inlet end 15 and a hot water inlet end 16, a seat 2 pivotally mounted on the seat base 1, and a spray pipe 4, a temperature control system 5 and a pre-flush system 6 assembled with the seat 2 and/or the seat base 1.

An inlet end of the temperature control system 5 is in communication with the cold water inlet end 15 and the hot water inlet end 16, respectively, and an outlet end of the temperature control system 5 is connected to an inlet end of the spray pipe 4.

An inlet end of the pre-flush system 6 is in communication with the outlet end of the hot water inlet end 16 or the temperature control system 5, and an outlet end of the pre-flush system 6 is in communication with the inlet end of the spray pipe 4.

The seat device provided by the present disclosure is a part of the seat cover or cover plate of the toilet. The seat device comprises the seat base 1, the seat 2, the spray pipe 4, the temperature control system 5, and the pre-flush system 6.

Figure 20:
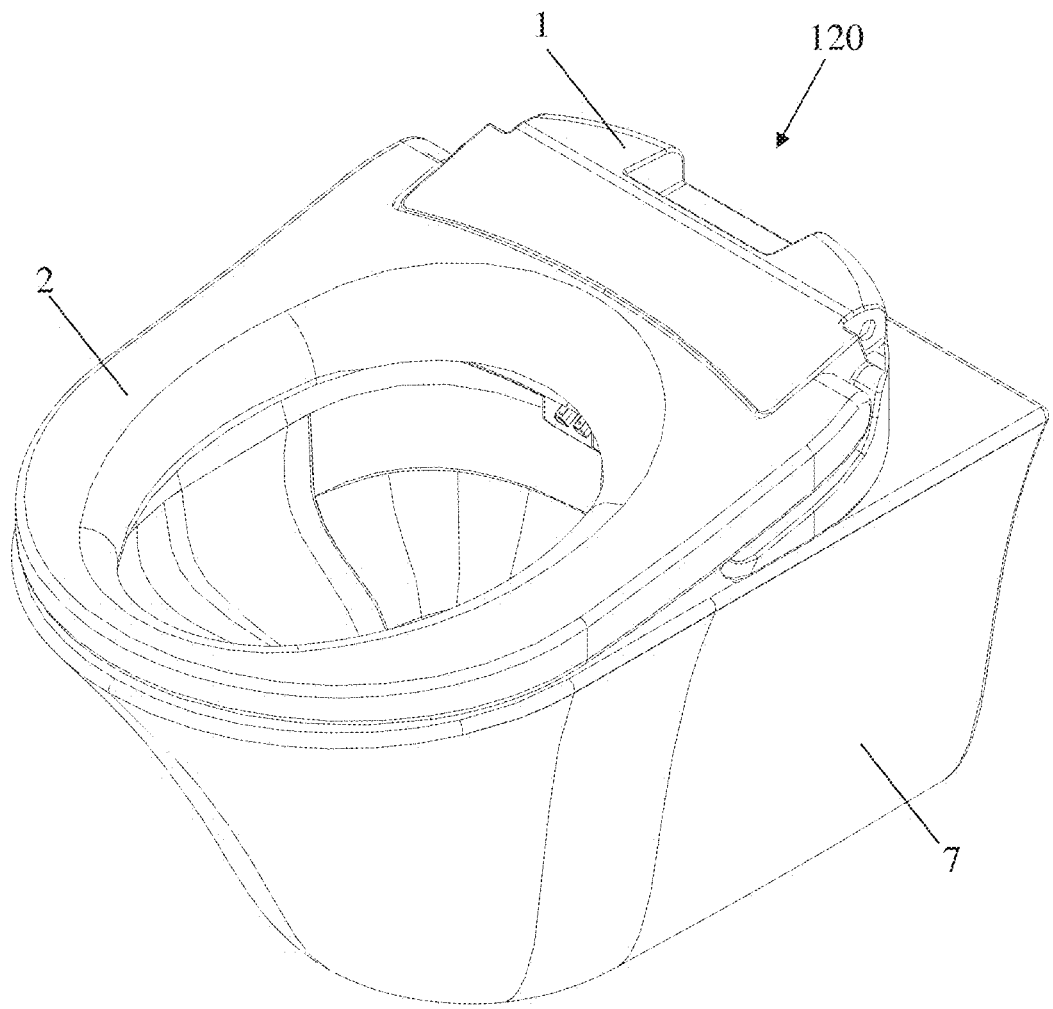
FIG. 20 is a stereoscopic view of a toilet provided by an embodiment of the present disclosure.

The seat base 1 is a mounting base, which is used to be mounted in a rear of a seat body 7 (ceramic body) of the toilet shown in FIG. 20.

The seat base 1 has a mounting cavity enclosed by a bottom plate 11, a top plate 12, and a side plate 13 (shown in FIGS. 6-9). The base plate 11 is provided with a seat base overflow pipe 14, the cold water inlet end 15 and the hot water inlet end 16. The cold water inlet end 15 and the hot water inlet end 16 each are inlet control valve. The cold water inlet end 15 is used to be connected with an external cold water pipeline, and the hot water inlet end 16 is used to be connected with an external hot water pipeline. The cold water inlet end 15 and hot water inlet end 16 can be provided with more than two outlets as needed to connect with different pipes.

The spray pipe 4 may optionally be mounted in the seat base 1 and/or in the seat 2. The spray pipe 4 may be a front spray pipe provided at a front end of the seat 2 and/or a rear spray pipe provided in the seat base 1. The spray pipe 4 is retractable, and the description of the spray pipe 4 is not described herein. A terminal end of the spray pipe 4 has a nozzle 41 for spraying water for flushing by the user. When the user uses the spray pipe 4, the spray pipe 4 extends out of the seat base 1 and/or the seat 2, and the nozzle 41 sprays water obliquely upward.

A cold water inlet of the temperature control system 5 is connected to one outlet of the cold water inlet end 15 through a hose, and a hot water inlet of the temperature control system 5 is connected to one outlet of the hot water inlet end 16 through a hose. The temperature control system 5 is used to mix the hot water and cold water to a preset temperature, for example about ±38° C. The temperature control system 5 can optionally be mounted in the seat base 1.

An outlet of the temperature control system 5 is connected to the inlet end of the spray pipe 4 through a hose to supply warm water or hot water to each spray pipe 4 for the user to flush.

The temperature control system 5 adopted in the present disclosure adjusts temperature by mixing hot water and cold water, and thus do not need to be equipped with a heater, which saves electricity, has a constant temperature function, can avoid the water temperature from being sudden hot and sudden cold, and enhance the user experience.

The inlet end of the pre-flush system 6 is connected to the outlet of the hot water inlet end 16 or the temperature control system 5 through a hose, and the outlet end of the pre-flush system 6 is connected to the spray pipe 4 through a hose. The pre-flush system 6 can be switched on and off by the user. The pre-flush system 6 is a pre-flush waterway, which is controlled by the corresponding valve. The user can operate the valve in the pre-flush waterway to control opening and closing of the pre-flush waterway. The valve may be a valve structure that can be controlled by the user such as a mechanical valve, solenoid valve, etc.

When the user uses the spray pipe 4, the hot water in the spray pipe 4 may be cooled down to cold water, and the direct spray will affect the user experience.

When the user uses the toilet, the spray pipe 4 is in a retracted state before the spray pipe 4 is used. The user may choose to preopen the pre-flush system 6. Hot water from the hot water inlet end 16 or the temperature control system 5 enters the pre-flush system 6 and then fills the spray pipe 4 to flush out the cold water in the spray pipe 4. The water in the spray pipe 4 can be discharged through the nozzle 41 into the ceramic body. The water pressure in the pre-flush system 6 is not too high, and the water in the spray pipe 4 will flow out slowly through the nozzle 41 instead of being sprayed out, which will not affect the user. As needed, an overflow hole can be provided at the location where the spray pipe 4 is mounted in the seat base 1 and/or seat 2 for the water discharged during the pre-flush to drain into the toilet body 7. When the user uses the spray pipe 4 again, the spray pipe 4 extends to spray water, and the water emitted from the spray pipe 4 is basically warm water, which enhances the user experience.

In one of the embodiments, as shown in FIG. 2 and FIG. 3, the inlet end of the spray pipe 4 comprises a main inlet end 42 and a pre-flush inlet end 43, with the temperature control system 5 in communication with the main inlet end 42 and the pre-flush system 6 in communication with the pre-flush inlet end 43.

In this embodiment, the temperature control system 5 and the pre-flush system 6 supply water to the spray pipe 4 through different inlet ends to achieve their respective functions.

In one of the embodiments, as shown in FIG. 2 and FIG. 3, the temperature control system 5 comprises a temperature control valve 51 and a temperature control system water valve 52.

An inlet end of the temperature control valve 51 is in communication with the cold water inlet end 15 and the hot water inlet end 16, respectively, and an outlet end of the temperature control valve 51 is in communication with an inlet end of the temperature control system water valve 52, and an outlet end of the temperature control system water valve 52 is in communication with the inlet end of the spray pipe 4.

Temperature control valve 51 can mix the incoming cold water and hot water to generate warm water with a preset temperature, to achieve a constant temperature effect, and there is no need for fast heating, which is conducive to power saving.

The temperature control valve outlet of the temperature control valve 51 is connected to the inlet of the temperature control system water valve 52 through a hose to supply warm water to the temperature control system water valve 52.

The outlet of temperature control system water valve 52 is connected to the inlet of each spray pipe 4 through a hose to supply warm water to each spray pipe 4 for flushing by the user.

Mechanical temperature control valve may be selected as the temperature control valve 51. The mechanical temperature control valve has a paraffin temperature package, to feel a temperature change of the mixed hot water and cold water. When the temperature control valve 51 is set to a preset temperature, the paraffin temperature package automatically adjusts the ratio of the incoming hot water and the incoming cold water, so as to achieve the purpose of relatively constant temperature of the effluent water, and the temperature change can be controlled within ±2° C., achieving constant temperature function. Mechanical temperature control valve is generally used to control the water temperature at about 38±2° C.

In one of the embodiments, the temperature control valve 51 is a temperature controlled adjusting valve capable of adjusting the temperature, which can be manually operated or electrically operated. The user can adjust the current water temperature according to actual needs. When the water temperature needs to be raised, the temperature controlled adjusting valve increases the amount of the incoming hot water, and reduces the amount of the incoming cold water. When the water temperature needs to be lowered, the temperature controller adjusting valve reduces the amount of the incoming hot water, and increases the amount of incoming cold water.

The temperature control valve 51 can directly adopt the temperature controlled adjusting valve applied in the water heaters and the heating field, and its specific working principle is not repeated herein.

In one embodiment, the temperature control system water valve 52 comprises a water mixing valve 522 and a spray pipe conversion valve 523.

The outlet of the temperature control valve 51 is connected to a hot water inlet of the water mixing valve 522, the cold water inlet end 15 (e.g., a cold water supply end) is in communication with a cold water inlet of the water mixing valve 522, an outlet of the water mixing valve 522 is in communication with an inlet of the spray pipe conversion valve 523, and an outlet of the spray pipe conversion valve 523 is in communication with the inlet end of the spray pipe 4.

In this embodiment, the temperature control system water valve 52 includes the water mixing valve 522 and the spray pipe conversion valve 523. The water mixing valve 522 is used to further mix warm water with cold water to meet the actual needs of the user. The spray pipe conversion valve 523 is used to control the water supply into the spray pipe 4 to control whether the front spray pipe or the rear spray pipe is opened to ensure that the front spray pipe and the rear spray pipe are not opened at the same time.

The water mixing valve 522 has the hot water inlet, cold water inlet and warm water outlet. The outlet of the temperature control valve 51 is connected to the hot water inlet of the water mixing valve 522 either directly or indirectly through a water pipe (hose) to achieve communication. The cold water supply end 15 is connected to the cold water inlet of the water mixing valve 522 either directly or indirectly through a water pipe (hose) to achieve communication. The warm water output from the temperature control valve 522 and the cold water output from the cold water supply end 15 are mixed and cooled down in the cavity of the water mixing valve 522 and then output from the warm water outlet.

The spray pipe conversion valve 523 has one inlet and more than one outlet. The outlet of the water mixing valve 522 is connected directly to the inlet of the spray pipe conversion valve 523 or through a water pipe (hose). The number of the outlets of the spray pipe conversion valve 523 correspond to the number of spray pipe 4, and each outlet of the spray pipe conversion valve 523 is connected to a spray pipe 4 through a water pipe (hose) to control the water supply to that spray pipe 4. The warm water output from the water mixing valve 522 is controlled and output to the corresponding spray pipe 4 by the spray pipe conversion valve 523.

In one of the embodiments, the temperature control system water valve 52 comprises a waterway adapter valve 521 having a hot water pipeline and a cold water pipeline.

An inlet of the hot water pipeline is in communication with the outlet of the temperature control valve 51, and an outlet of the hot water pipeline is in communication with the hot water inlet of the water mixing valve 522.

An inlet of the cold water pipeline is in communication with the cold water supply end 15, and an outlet of the cold water pipeline is in communication with the cold water inlet of the water mixing valve 522.

In this embodiment, the temperature control system water valve 52 is provided with the waterway adapter valve 521 having the hot water pipeline and cold water pipeline that are independent of each other, to facilitate the connection of respective waterways of the temperature control valve 51, cold water supply 15 and water mixing valve 522. The waterway adapter valve 521 can be optionally mounted in the seat base 1.

Figure 11:
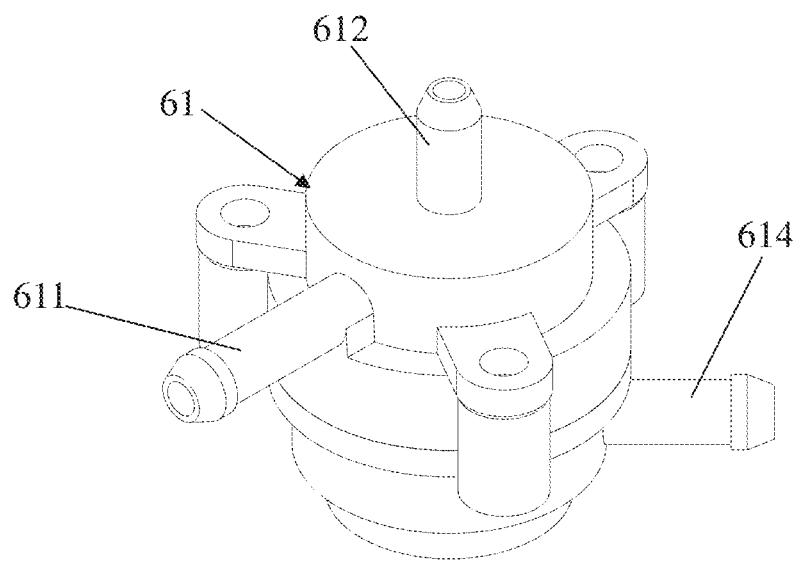
FIG. 11 is a stereoscopic view of a drain valve.
Figure 12:
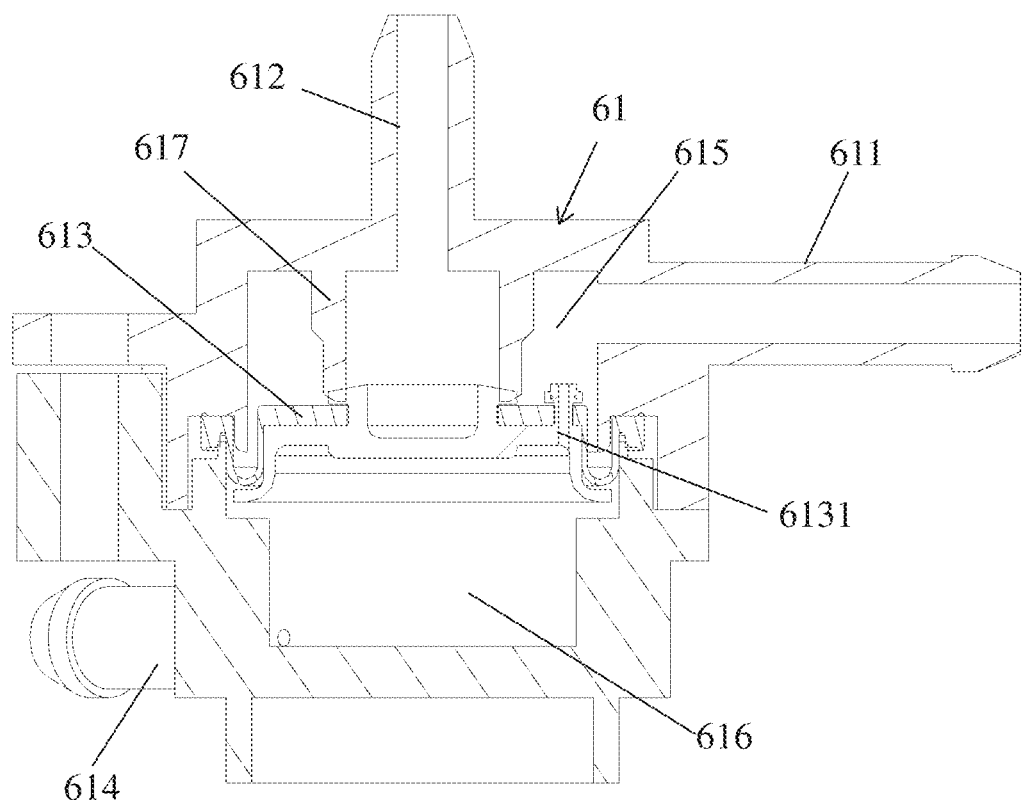
FIG. 12 is a sectional view of the drain valve.

In one of the embodiments, as shown in FIG. 11 and FIG. 12, the pre-flush system 6 comprises a drain valve 61.

The drain valve 61 comprises a drain valve inlet pipe 611, a drain valve outlet pipe 612 and a drain valve diaphragm 613 for controlling opening and closing of the drain valve outlet pipe 612.

The drain valve inlet pipe 611 is in communication with the hot water inlet end 16, and the drain valve outlet pipe 612 is in communication with the inlet of the spray pipe 4.

The pre-flush system 6 also comprises a control mechanism 62 for controlling the opening and closing of the drain valve diaphragm 613.

When the control mechanism 62 is in an initial state, the drain valve diaphragm 613 is in a closed state.

When the control mechanism 62 is in a triggered state, the drain valve diaphragm 613 is in an opened state.

In this embodiment, the pre-flush system 6 uses the drain valve 61 and control mechanism 62 to achieve the pre-flush function of the spray pipe 4, flushing out the cold water in the spray pipe 4 through the hot water before the user uses the spray pipe 4 and filling the spray pipe 4 with hot water. When the user uses it, the nozzle 41 directly emits hot water.

The drain valve 61 is mounted on the base plate 11. The drain valve 61 has the drain valve inlet pipe 611 and the drain valve outlet pipe 612 connected to it, and the drain valve 61 has the drain valve diaphragm 613. The drain valve outlet pipe 612 is connected to the inlet end of the spray pipe 4 through a water pipe for supplying hot water to the spray pipe 4. The drain valve diaphragm 613 can control the opening and closing of the drain valve outlet pipe 612 to control the water supply from the drain valve outlet pipe 612 to the spray pipe 4.

The control mechanism 62 may be an electric control mechanism or a mechanical mechanism. The control mechanism 62 may be triggered to act to control the opening and closing of the drain valve diaphragm 613, which in turn controls the opening and closing of the drain valve outlet pipe 612. The control mechanism 62 may directly control the drain valve diaphragm 613 to act or indirectly control the drain valve diaphragm 613 to act. If the control mechanism 62 is an electric control mechanism or mechanical mechanism, a connecting rod is installed on an output end of the electric control mechanism or mechanical mechanism, and drain valve diaphragm 613 is sleeved on the connecting rod, and driven by the connecting rod to act. The control mechanism 62 can also drive the drain valve diaphragm 613 to act by water pressure.

When the control mechanism 62 is in the initial state, the drain valve diaphragm 613 is in the closed state and the drain valve outlet pipe 612 is closed.

When the control mechanism 62 is in the triggered state, the drain valve diaphragm 613 is in the opened state and the drain valve outlet pipe 612 supplies hot water to the spray pipe 4 to flush the cold water out of the spray pipe 4.

In one of the embodiments, as shown in FIG. 2 and FIGS. 4-13, the seat 2 is connected to the seat base 1 by a pivot shaft 3, and the pivot shaft 3 is capable of adjustment by moving up and down relative to the seat base 1.

Between the seat base 1 and the pivot shaft 3 is assembled a reset mechanism 32 for driving the pivot shaft 3 to move upward and reset.

The control mechanism 62 comprises a first trigger end 620 and the pivot shaft 3 is provided with a second trigger end 31 for triggering the first trigger end 620.

When the seat 2 is in an initial position, the first trigger end 620 is in an initial state.

When the seat 2 is in a descending position, the second trigger end 31 triggers the first trigger end 620 and puts the control mechanism 62 in the triggered state.

In this embodiment, the control mechanism 62 comprises the first trigger end 620, and the control mechanism 62 switches from the initial state to the triggered state when the first trigger end 620 is triggered by pressing.

The seat 2 can be moved up and down with respect to the seat base 1 so that the control mechanism 62 can be triggered.

A longer pivot shaft 3 can be provided at the rear of the seat 2 as needed, or a shorter pivot shaft 3 can be provided on the left and right sides of the rear of the seat 2 respectively.

The side plates 13 on the left and right sides of the seat base 1 have adjustment holes 131, and the adjustment holes 131 may be bar-shaped holes or waist-shaped holes, which have the size in the height direction greater than the size in forward and backward direction. The pivot shaft 3 passes through the adjustment hole 131 with a clearance therebetween and can be adjusted by moving up and down in the adjustment hole 131. The pivot shaft 3 is mounted with a second trigger end 31 for triggering the first trigger end 620. The second trigger end 31 may be a slider.

The reset mechanism 32 is assembled between the pivot shaft 3 and the seat base 1, and the reset mechanism 32 may be a spring or resilient member. When the seat 2 is not under pressure, the reset mechanism 32 drives the pivot shaft 3 to move upwardly to a top of the adjustment hole 131 so that the rear of the seat 2 is in a higher position.

In an initial state, that is, when the seat 2 is not under pressure from the user, the pivot shaft 3 is driven to move upwardly to the top of the adjustment hole 131 by the reset mechanism 32. At this time, a rear end of the seat 2 is in a higher position, and the rear end of the seat 2 does not contact the rear of the toilet body 7 (ceramic body), and there is a certain distance between them to provide a cushion space.

When there is a user sitting on the seat 2, the seat 2 is under pressure and drives the pivot shaft 3 to move downward against the acting force of the reset mechanism 32 until the pivot shaft 3 reaches a bottom of the adjustment hole 131. At this time, the rear end of the seat 2 is in a lower position, and the rear end of the seat 2 is in contact with the rear of the toilet body 7 (ceramic body). The second trigger end 31 is lowered to the lowest position/descending position, and the second trigger end 31 triggers the first trigger end 620.

At the same time, in the above process, the reset mechanism 32 provides a certain damping to slow down the descending of the rear end of the seat 2, thus providing a cushion effect and facilitating the user to gradually adapt to the hard contact between the seat 2 and the toilet body 7, thus enhancing the user experience.

In one of the embodiments, as shown in FIGS. 4-10, the seat base 1 has a guide groove 17 extending vertically in the seat base 1, and the second trigger end 31 is in clearance fit (e.g., engaged) with the guide groove 17.

The first trigger end 620 is kept in contact with the second trigger end 31 and can be pressed down to the triggered position by the second trigger end 31.

In this embodiment, the guide groove 17 serves to guide the second trigger end 31 to slide up and down.

The first trigger end 620 can slide up and down, and it can automatically reset to a higher initial position under the action of the reset member.

When the seat 2 or the second trigger end 31 is in the initial position, the first trigger end 620 is in the initial position (higher position) and the control mechanism 62 is in the initial state.

When the seat 2 or the second trigger end 31 is in the descending position or the lowest position, the first trigger end 620 is pressed down by the second trigger end 31 to the descending position or the lowest position and the control mechanism 62 is in the triggered state.

In one of the embodiments, the top plate 12 has a guide column 121 extending downward, the second trigger end 31 has a guide hole, and the guide column 121 is in clearance fit (e.g., engaged) with the guide hole to guide the second trigger end 31 to slide up and down.

In one of the embodiments, the drain valve 61 also comprises a drain valve pressure relief pipe 614, and the control mechanism 62 is connected to the drain valve pressure relief pipe 614.

When the control mechanism 62 is in the initial state, the drain valve pressure relief pipe 614 is in a stopping draining state.

When the control mechanism 62 is in the triggered state, the drain valve pressure relief pipe 614 is in the draining state.

In this embodiment, opening and closing of the drain valve diaphragm 613 is controlled by water pressure.

The drain valve 61 has an upper water cavity 615 and a lower water cavity 616. The drain valve outlet pipe 612 is mounted at the top of the drain valve 61, and the inlet of the drain valve outlet pipe 612 has a circle of baffle rib 617 extending downward. The drain valve diaphragm 613 is in the upper water cavity 615 and the lower water cavity 616, and the drain valve diaphragm 613 has a communication hole 6131.

When the drain valve pressure relief pipe 614 does not drain outward, the water in the upper water cavity 615 enters the lower water cavity 616, gradually making the water pressure in the upper water cavity 615 and the water pressure in the lower water cavity 616 balance, such that the drain valve diaphragm 613 seals the baffle rib 617, and the drain valve outlet pipe 612 does not drain.

When the drain valve pressure relief pipe 614 drains outward, the water pressure in the lower water cavity 616 decreases, the drain valve diaphragm 613 leaves the baffle rib 617 downward, and the drain valve outlet pipe 612 drains.

The control mechanism 62 is used to control the drain valve pressure relief pipe 614 to drain or stop draining, and the control mechanism 62 may be a valve structure connected to the drain valve pressure relief pipe 614.

When the control mechanism 62 is in the initial state, drain valve pressure relief pipe 614 does not drain and drain valve outlet pipe 612 does not drain.

When the control mechanism 62 is in the triggered state, the drain valve pressure relief pipe 614 drains and the drain valve outlet pipe 612 drains.

The water drained from the drain valve pressure relief pipe 614 can flow into the seat base overflow pipe 14 through the pipe to clean the ceramic body.

Certainly, in this embodiment, the control mechanism 62 can also be provided with a first trigger end 620, which can be triggered by the second trigger end 31 in the above embodiment.

In one of the embodiments, as shown in FIG. 11 and FIG. 12, the control mechanism 62 comprises a water storage valve 621 having a water storage cavity 6211.

The water storage valve 621 is connected to a water storage valve inlet pipe 623 and a water storage valve drain pipe 624 in communication with the water storage cavity 6211, with an inlet control valve 625 in the water storage valve inlet pipe 623 and a drain control valve 626 in the water storage valve drain pipe 624.

The water storage valve inlet pipe 623 is in communication with the drain valve pressure relief pipe 614.

When the control mechanism 62 is in the initial state, the inlet control valve 625 is in a closed state and the drain control valve 626 is in an opened state.

When the control mechanism 62 is in the triggered state, the inlet control valve 625 is in an opened state and the drain control valve 626 is in a closed state.

In this embodiment, the control mechanism 62 adopts a water storage valve 621 with a time delay function to extend the drainage time of the drain valve outlet pipe 612.

In this embodiment, the control mechanism 62 comprises the water storage valve 621, the water storage valve inlet pipe 623, the water storage valve drain pipe 624, the inlet control valve 625, and the drain control valve 626.

The water storage valve 621 has the water storage cavity 6211, and the water storage valve inlet pipe 623 and water storage valve drain pipe 624 are in communication with the water storage cavity 6211 respectively. The inlet control valve 625 is mounted in the water storage valve inlet pipe 623 to control opening and closing of the water storage valve inlet pipe 623. The drain control valve 626 is mounted in the water storage valve drain pipe 624 for controlling opening and closing of the water storage valve drain pipe 624. The inlet control valve 625 and the drain control valve 626 are opened and closed alternately.

The water storage valve inlet pipe 623 is in communication with the drain valve pressure relief pipe 614, and the both may be connected directly or indirectly through piping.

If the inlet control valve 625 and drain control valve 626 are solenoid valves, they are controlled by the electric control mechanism in the control mechanism 62. If the inlet control valve 625 and the drain control valve 626 are mechanical valves, they are controlled by the mechanical mechanism in the control mechanism 62. When the first trigger end 620 is triggered, the electric control mechanism or mechanical mechanism in the control mechanism 62 acts to drive the inlet control valve 625 and the drain control valve 626 to open and close alternately.

When the control mechanism 62 is in the initial state, the inlet control valve 625 is in the closed state and the water storage valve inlet pipe 623 is closed, and thus the drain valve pressure relief pipe 614 does not drain, the drain valve diaphragm 613 is closed, and the drain valve outlet pipe 612 does not drain. At this time, the drain control valve 626 is in the opened state and the water storage valve drain pipe 624 drains the water in the storage cavity 6211 to a preset low water level, in preparing for the next water storage. The water drained from the water storage valve drain pipe 624 can flow into the seat base overflow pipe 14 through the pipe to clean the ceramic body.

When the control mechanism 62 is in the triggered state, the inlet control valve 625 is in the opened state, the water storage valve inlet pipe 623 is opened, and thus the drain valve pressure relief pipe 614 drains, the drain valve diaphragm 613 is opened, and the drain valve outlet pipe 612 drains. At this time, the drain control valve 626 is in the closed state to store water for the water storage cavity 6211. When water stored in the water storage cavity 6211 reaches the preset high water level, water no longer enters the water storage cavity 6211, the inlet control valve 625 is closed. In this process, the time taken by the water in the water storage cavity 6211 to rise from the low water level to the high water level is a delay time, which can be set according to actual needs. The delay time is basically the drainage time of the drain valve outlet pipe 612. The delay time is determined by the volume of the water storage cavity 6211 and the water flow in the water storage valve inlet pipe 623.

The height, installation method and installation position of the water storage valve inlet pipe 623 and the water storage valve drain pipe 624 can be set according to actual needs. The drawings merely show one or two installation modes, which does not mean that such installation is inevitable.

In an embodiment, the water storage valve drain pipe 624 is in communication with a bottom of the water storage cavity 6211, and the water storage valve inlet pipe 623 is in communication with a top of the water storage cavity 6211.

In one of the embodiments, as shown in FIGS. 13-17, the control mechanism 62 also comprises a switching valve 622 connected to a water storage valve inlet pipe 623 and a water storage valve drain pipe 624.

The switching valve 622 comprises a switching valve housing 6220 having a channel 6221 and a switching shaft 6222 that is in clearance fit (e.g., engaged) with the channel 6221. The switching shaft 6222 is capable of alternately triggering the drain control valve 626 and the inlet control valve 625.

When the switching shaft 6222 is in an initial position, the switching shaft 6222 triggers the drain control valve 626, and the drain control valve 626 is in the opened state.

When the switching shaft 6222 is in a triggered position, the switching shaft 6222 triggers the inlet control valve 625, and the inlet control valve 625 is in the opened state.

In this embodiment, the switching valve 622 uses the switching shaft 6222 to alternately trigger the inlet control valve 625 and the drain control valve 626. The first trigger end 620 is configured at an upper end of the switching shaft 6222 of the switching valve 622, and the switching shaft 6222 is below the second trigger end 31. The first trigger end 620 may be an end cap or plate, or the first trigger end 620 may be the upper end portion of the switching shaft 6222 directly.

The switching valve 622 has a channel 6221 extending vertically, and the main body portion of the switching shaft 6222 is in clearance fit (e.g., engaged) with the channel 6221. The upper end of the switching shaft 6222 is above the switching valve housing 6220 and is used to be triggered by pressing.

In one of the assembly mode, the switching shaft 6222 and the first trigger end 620 can be triggered by the downward pressing of the second trigger end 31 of the pivot shaft 3 of the above-mentioned seat 2 that can move up and down.

In an alternative assembly mode, the switching shaft 6222 and first trigger end 620 may be connected to a handle, which is on the outside of the toilet, and the user may operate the handle to trigger the switching shaft 6222 and first trigger end 620 by pressing.

When the switching shaft 6222 is in the initial position, the upper end of the switching shaft 6222 is in a higher position above the switching valve housing 6220. After the switching shaft 6222 is triggered by a press, the upper end of the switching shaft 6222 is in a lower position above the switching valve housing 6220.

The switching shaft 6222 has a triggering or driving portion for triggering the inlet control valve 625 and the drain control valve 626, which may be a protrusion, recess or telescopic element, etc., provided on the switching shaft 6222.

The water storage valve inlet pipe 623 and the water storage valve drain pipe 624 are connected to the switching valve housing 6220 and in communication with the channel 6221, respectively. Therefore, when the switching shaft 6222 is moved to the corresponding position, the triggering/driving portion on the switching shaft 6222 can trigger the inlet control valve 625 or the drain control valve 626. When the inlet control valve 625 is triggered, the inlet control valve 625 opens the storage valve inlet pipe 623. When the drain control valve 626 is triggered, the drain control valve 626 opens the storage valve drain pipe 624.

In this case, when the switching shaft 6222 is in the initial position, at this time, the switching shaft 6222 triggers the drain control valve 626 to open, while the inlet control valve 625 is not triggered and remains closed, and the water storage cavity 6211 is in a draining state.

When the switching shaft 6222 is pressed to the triggered position, the switching shaft 6222 triggers the inlet control valve 625 to open, and the drain control valve 626 is not triggered and remains closed, and the water storage cavity 6211 is in a water storage state.

In this arrangement, the switching shaft 6222 controls the alternate opening and closing of the inlet control valve 625 and the drain control valve 626 to control the water storage and drainage functions of the water storage cavity 6211.

In one of the embodiments, as shown in FIGS. 13-17, a switching shaft reset member 6223 is connected between the switching valve housing 6220 and the switching shaft 6222 for driving the switching shaft 6222 to reset to its initial position. The switching shaft reset member 6223 is connected between the switching shaft 6222 and the top of the switching valve housing 6220 for driving the switching shaft 6222 to move upward to its initial position to reset. The switching valve housing 6220 may choose spring.

In one of the embodiments, as shown in FIGS. 14-19, the inlet control valve 625 comprises a first slide valve 6251 and a first reset member 6252 for driving the first slide valve 6251 to reset to a closed state.

The drain control valve 626 comprises a second slide valve 6261 and a second reset member 6262 for driving the second slide valve 6261 to a closed state.

When the switching shaft 6222 is in the initial position, the first slide valve 6251 is in a closed state and the second slide valve 6261 is driven to open by the switching shaft 6222.

When the switching shaft 6222 is in the triggered position, the second slide valve 6261 is in a closed sate and the first slide valve 6251 is driven to open by the switching shaft 6222.

In this embodiment, both the inlet control valve 625 and the drain control valve 626 use a mechanical slide valve structure as follows.

Figure 18:
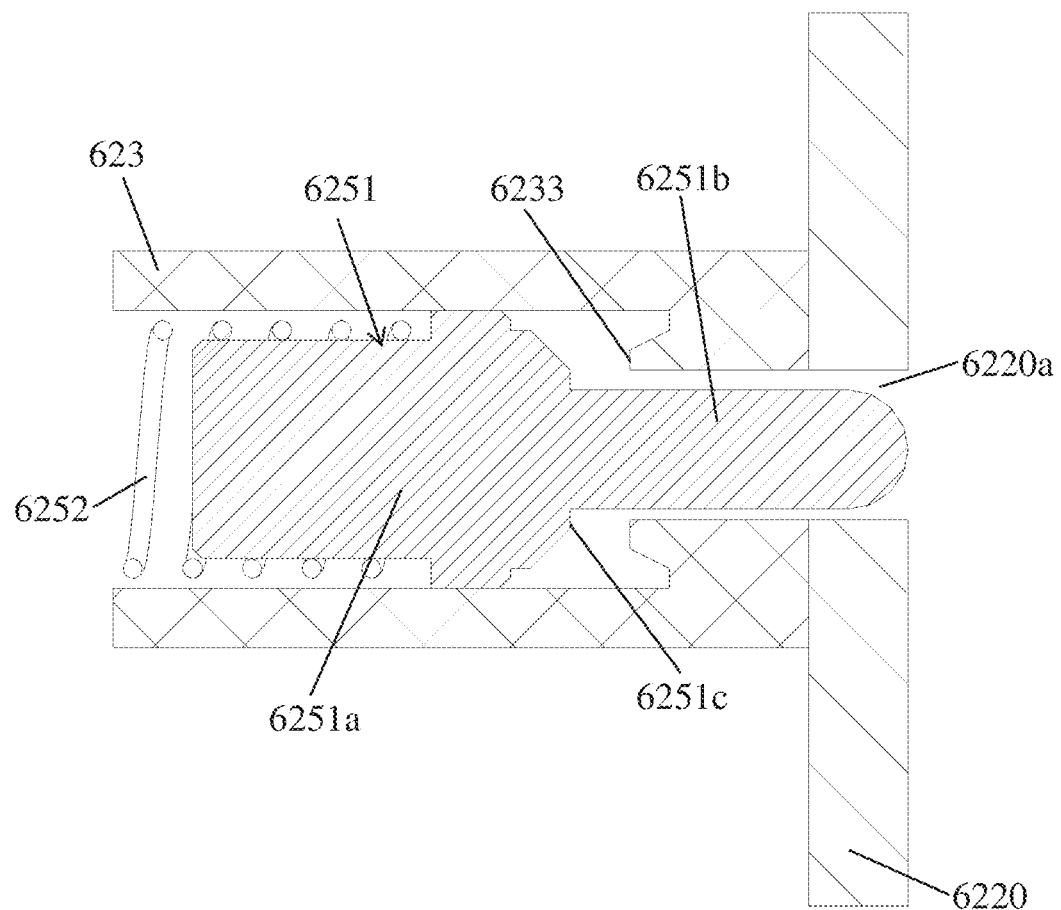
FIG. 18 is a schematic diagram of the assembly of a water storage valve inlet pipe, the first slide valve, a first reset member and a switching valve housing.

As shown in FIG. 18, the inlet control valve 625 comprises the first slide valve 6251 and the first reset member 6252. the first slide valve 6251 is slidably mounted in the water storage valve inlet pipe 623. A first through hole 6220a is provided in the switching valve housing 6220, and the water storage valve inlet pipe 623 is connected to the first through hole 6220a, thereby is in communication with the channel 6221. The water storage valve inlet pipe 623 has a first stop portion 6233 at the end of the water storage valve inlet pipe 623 near the first through hole 6220a, and a seal ring can be provided on the first stop portion 6233 as needed.

The first slide valve 6251 comprises a thicker first slide valve body 6251a and a first slide valve rod 6251b connected to the first slide valve body 6251a, the first slide valve rod 6251b extending toward and passable through the first through hole 6220a. A first step portion 6251c is formed at the connection between the first slide valve rod 6251b and the first slide valve body 6251a. The first step portion 6251c is in contact with and seals the first stop portion 6233 when the first slide valve 6251 is in the closed state, thereby closing the water storage valve inlet pipe 623.

The first reset member 6252 is connected to the first slide valve body 6251a for driving the first slide valve 6251 toward the side of the switching valve housing 6220 to enable the opened first slide valve 6251 to automatically reset to the closed position. The first reset member 6252 may be a spring.

Figure 19:
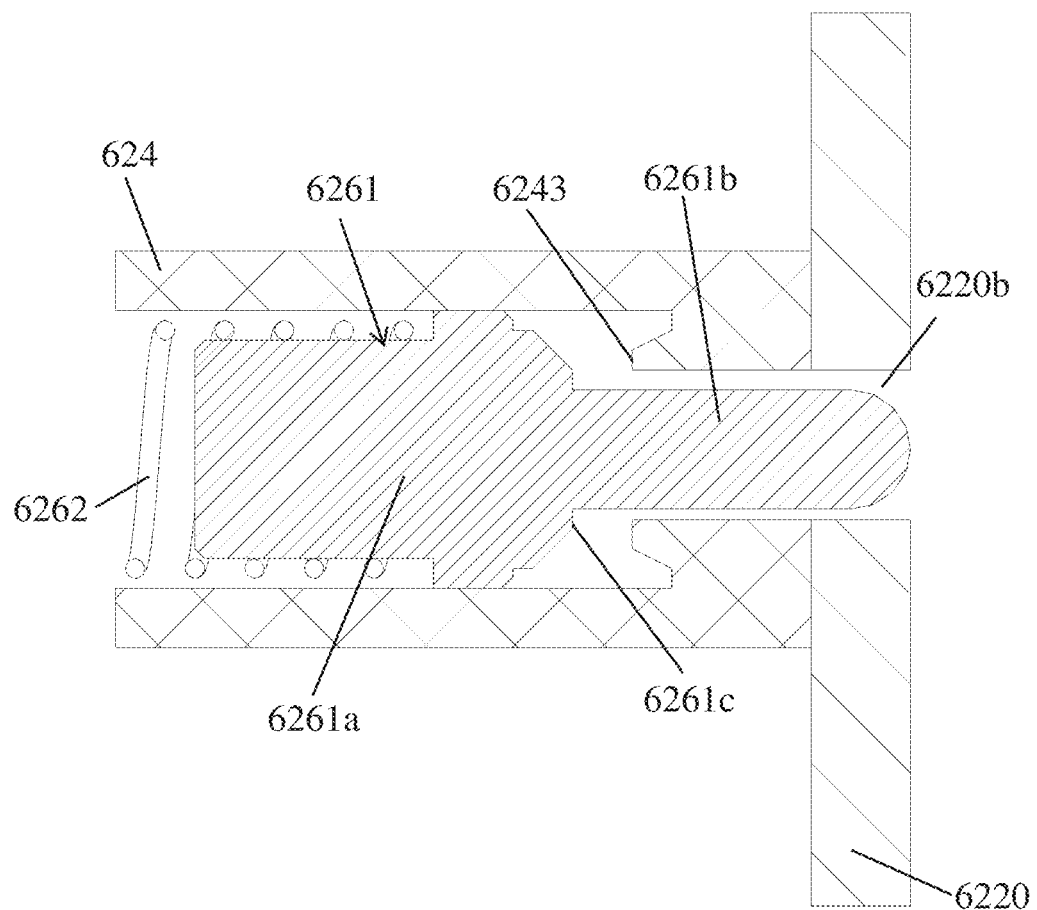
FIG. 19 is a schematic diagram of the assembly of a water storage valve drain pipe, the second slide valve, a second reset member and the switching valve housing.

As shown in FIG. 19, the drain control valve 626 comprises the second slide valve 6261 and the second reset member 6262. The second slide valve 6261 is slidably mounted in the water storage valve drain 624. A second through hole 6220b is provided in the switching valve housing 6220, and the water storage valve drain pipe 624 is connected to the second through hole 6220b, thereby is in communication with the channel 6221. The water storage valve drain pipe 624 has a second stop portion 6243 at the end of the water storage valve drain pipe 624 near the second through hole 6220b, and a seal ring may be provided on the second stop portion 6243 as needed.

The second slide valve 6261 comprises a thicker second slide valve body 6261a and a second slide valve rod 6261b connected to the second slide valve body 6261a, the second slide valve rod 6261b extending toward and through the second through hole 6220b. A second step portion 6261c is formed at the connection of the second slide valve rod 6261b to the second slide valve body 6261a. The second step portion 6261c is in contact with and seals the second stop portion 6243 when the second slide valve 6261 is in the closed state, thereby closing the water storage valve drain 624.

The second reset member 6262 is connected to the second slide valve body 6261*a* for driving the second slide valve 6261 to move toward the side of the switching valve housing 6220 to enable the opened second slide valve 6261 to automatically reset to the closed position. The second reset member 6262 may be a spring.

When the switching valve 622 is in the initial position:

Under the action of the first reset member 6252, the first slide valve rod 6251*b* extends into the channel 6221 through the first through hole 6220*a*, the first step portion 6251*c* is in contact with the first stop portion 6233 and forms a seal therebetween, and the first slide valve 6251 closes the water storage valve inlet pipe 623 and will not supply water to the water storage cavity 6211.

The triggering/driving portion of the switching shaft 6222 cooperates and is in contact with the second slide valve rod 6261*b* of the second slide valve 6261 and overcomes the acting force of the second reset member 6262, pushing the second slide valve rod 6261*b* back from the channel 6221 so that the second step portion 6261*c* is separated from the second stop portion 6243, the water storage valve drain pipe 624 is opened, and the water storage cavity 6211 can be drained.

When the switching valve 622 is in the triggered position:

The triggering/driving portion of the switching shaft 6222 cooperates and is in contact with the first slide valve rod 6251*b* of the first slide valve 6251 and overcomes the acting force of the first reset member 6252, pushing the first slide valve rod 6251*b* backward from the channel 6221, so that the first step portion 6251*c* is separated from the first stop portion 6233, the water storage valve inlet pipe 623 is opened, and the water storage cavity 6211 can store water.

Under the action of the second reset member 6262, the second slide valve rod 6261*b* extends into the channel 6221 through the second through hole 6220*b*, the second step portion 6261*c* is in contact with the second stop portion 6243 and forms a seal therebetween, the second slide valve 6261 closes the water storage valve drain pipe 624, and the water storage cavity 6211 does not drain.

In one of the embodiments, as shown in FIGS. 14-19, a first recess 6222*a* for accommodating an end portion of the first slide valve 6251 and a second recess 6222*b* for accommodating an end portion of the second slide valve 6261 are provided at intervals on the switching shaft 6222.

When the switching shaft 6222 is in the initial position, one end of the first slide valve 6251 is in the first recess 6222*a* and one end of the second slide valve 6261 is in contact with a circumferential surface of the switching shaft 6222.

When the switching shaft 6222 is in the triggered position, one end of the second slide valve 6261 is in the second recess 6222*b* and one end of the first slide valve 6251 is in contact with the circumferential surface of the switching shaft 6222.

In this embodiment, the first recess 6222*a* and the second recess 6222*b* are provided at intervals on the switching shaft 6222, and the first recess 6222*a* and the second recess 6222*b* may be circular grooves provided on the switching shaft 6222. The first recess 6222*a* is for accommodating the end portion of the first slide valve 6251 and the second recess 6222*b* is for accommodating the end portion of the second slide valve 6261.

When the switching shaft 6222 in the initial position, the first recess 6222*a* is aligned with the first through hole 6220*a* and the end portion of the first slide valve 6251 (i.e., one end of the first slide valve rod 6251*b*) is inserted into the first recess 6222*a* through the first through hole 6220*a*. At this time, the first step portion 6251*c* is made to contact and seal the first stop portion 6233 under the action of the first reset member 6252, and the first slide valve 6251 closes the water storage valve inlet pipe 623.

When the switching shaft 6222 is in the initial position, the second recess 6222*b* is staggered from the second through hole 6220*b*, and the end portion of the second slide valve 6261 (i.e., one end of the second slide valve rod 6261*b*) leaves the second recess 6222*b* and contacts the circumferential surface or protrusion of the switching shaft 6222, thereby driving the second slide valve 6261 to compress the second reset member 6262 and causing the second step portion 6261*c* to separate from the second stop portion 6243, and the second slide valve 6261 to open, opening the water storage valve drain 624.

When the switching shaft 6222 is in the triggered state, the first recess 6222*a* is staggered from the first through hole 6220*a*, and the end portion of the first slide valve 6251 (i.e., one end of the first slide valve rod 6251*b*) leaves the first recess 6222*a* and contacts the circumferential surface or protrusion of the switching shaft 6222, thereby driving the first slide valve 6251 to compress the first reset member 6252 and causing the first step portion 6251*c* to separate from the first stop portion 6233, and the first slide valve 6251 to open, opening the water storage valve inlet pipe 623.

When the switching shaft 6222 is in the triggered state, the second recess 6222*b* is aligned with the second through hole 6220*b* and the end portion of the second slide valve 6261 (i.e., one end of the second slide valve rod 6261*b*) is inserted into the second recess 6222*b* through the second through hole 6220*b*. At this point, the second step portion 6261*c* is made to contact and seal the second stop portion 6243 under the action of the second reset member 6262, and the second slide valve 6261 closes the water storage valve drain 624.

In one of the embodiments, as shown in FIGS. 13-17, the water storage valve inlet pipe 623 comprises a first inlet pipe 6231 and a second inlet pipe 6232.

The first inlet pipe 6231 communicates the drain valve pressure relief pipe 614 to the first recess 6222*a*, and the second inlet pipe 6232 communicates the water storage cavity 6211 to the first recess 6222*a*.

The inlet control valve 625 is in the first inlet pipe 6231 or in the second inlet pipe 6232.

In this embodiment, the first recess 6222*a* is used as a water cavity. The water storage valve inlet pipe 623 comprises the first inlet pipe 6231 and the second inlet pipe 6232, and the switching valve housing 6220 is connected between the first inlet pipe 6231 and the second inlet pipe 6232. The first inlet pipe 6231 is in communication with the drain valve pressure relief pipe 614, and the first inlet pipe 6231 is in communication with the first recess 6222*a*. One end of the second inlet pipe 6232 is in communication with the water storage cavity 6211 and the other end of the second inlet pipe 6232 is in communication with the first recess 6222*a*.

When the inlet control valve 625 is opened, the water in the drain valve pressure relief pipe 614 can enter the water storage cavity 6211 through the first inlet pipe 6231, the first recess 6222*a* and the second inlet pipe 6232.

Figure 14:
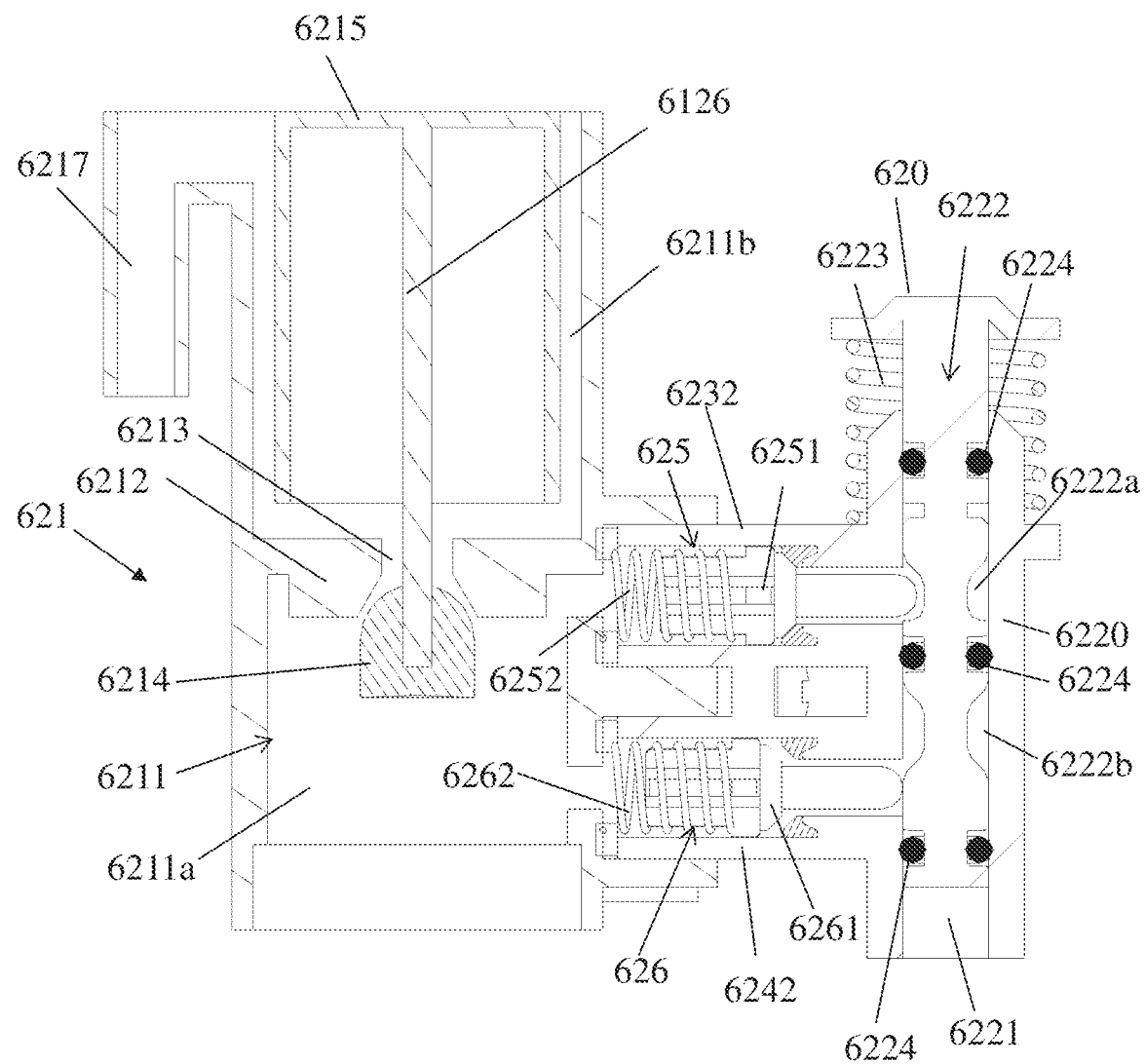
FIG. 14 is a sectional view of a first slide valve provided in a second inlet pipe with the first slide valve in a closed state and a second slide valve in an opened state.
Figure 15:
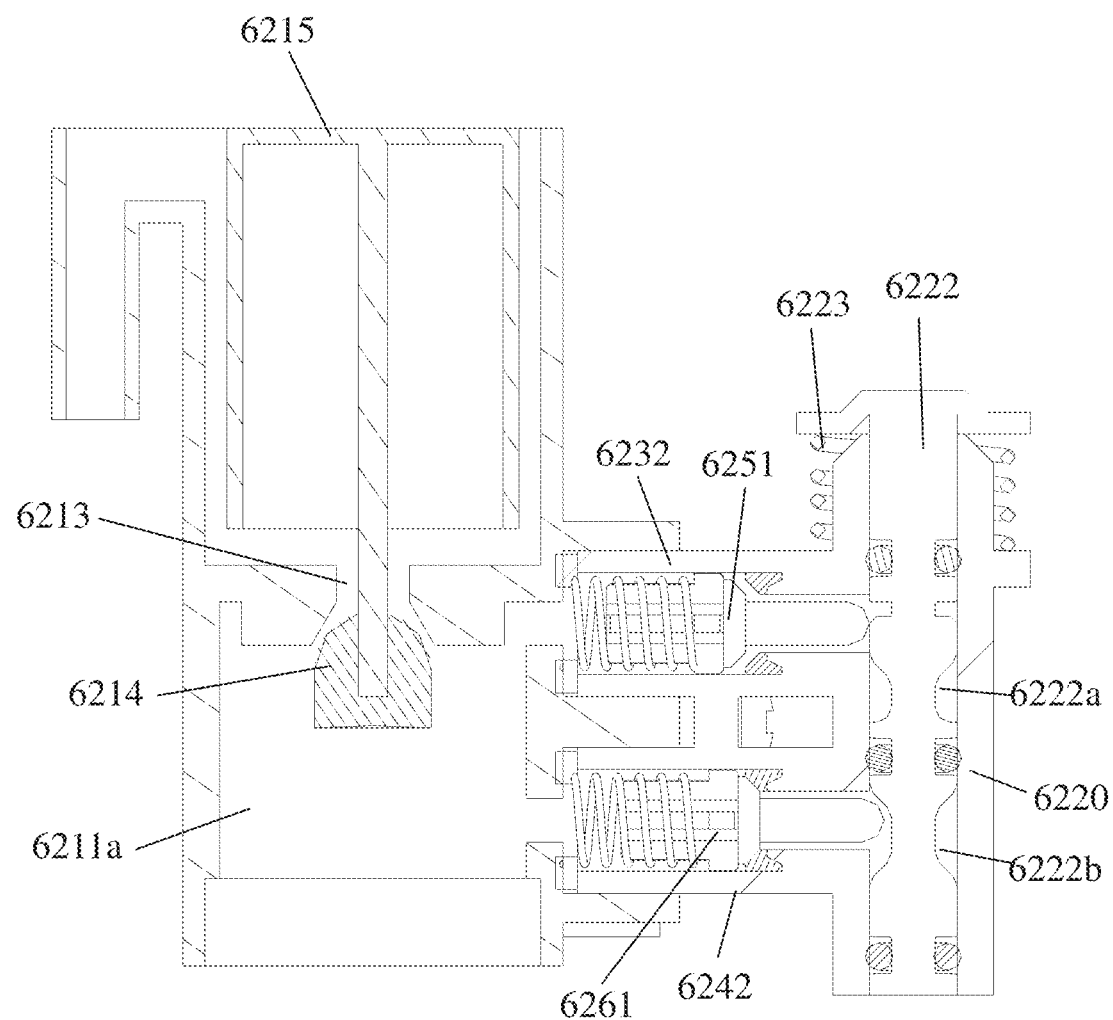
FIG. 15 is a sectional view of the first slide valve provided in the second inlet pipe with the first slide valve in an opened state and the second slide valve in a closed state.

As shown in FIG. 14 and FIG. 15, the inlet control valve 625 may be arranged in the second inlet pipe 6232. In this structure, the water flow direction of the incoming water is opposite to the acting direction of the first reset member 6252, and the first reset member 6252 is required to provide a large elastic force to overcome the water pressure of the incoming water to avoid the first slide valve 6251 from being opened by the water flow to ensure that the first slide valve 6251 can be closed.

Figure 16:
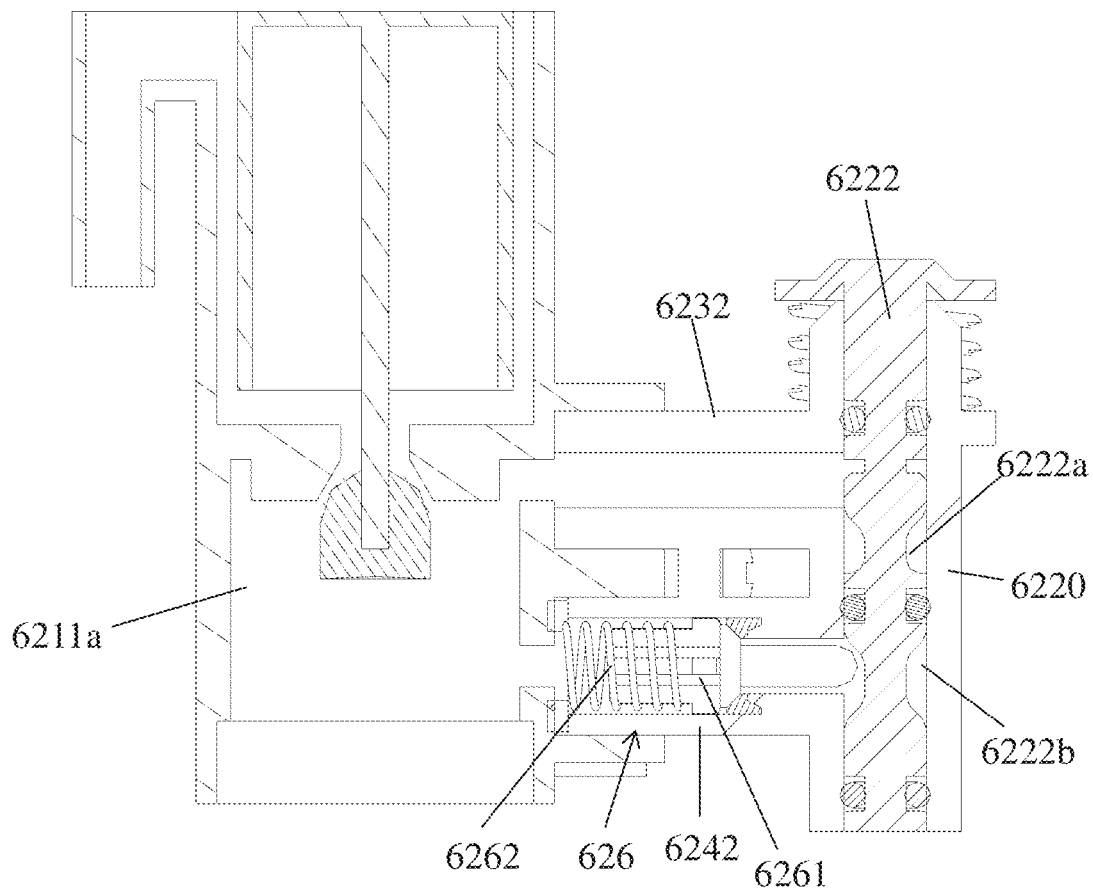
FIG. 16 is a sectional view of the first slide valve provided in a first inlet pipe and a second slide valve provided in a second drain pipe, with the second slide valve in an opened state.
Figure 17:
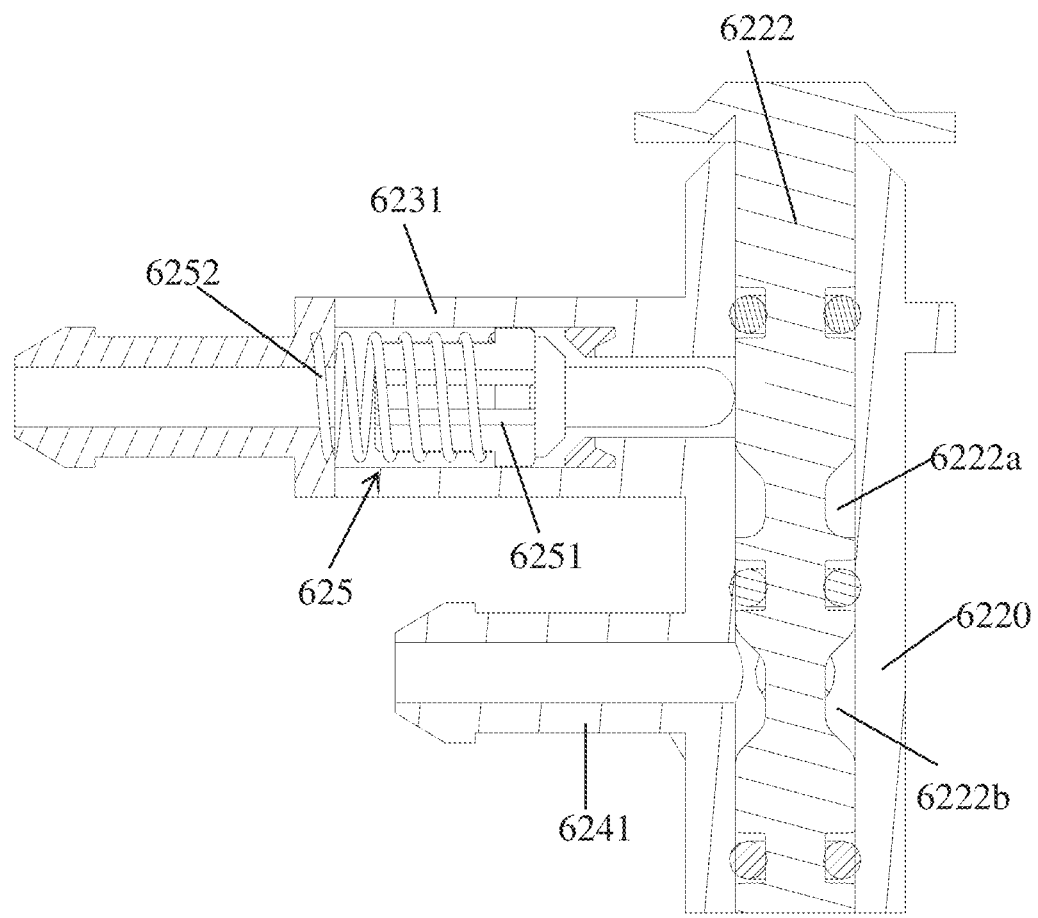
FIG. 17 is a sectional view of the first slide valve provided in the first inlet pipe with the first slide valve in a closed state.

In an embodiment, as shown in FIG. 16 and FIG. 17, the inlet control valve 625 is arranged in the first inlet pipe 6231. In this structure, the water flow direction of the incoming water is the same as the acting direction of the first reset member 6252, and the first reset member 6252 acts on the first slide valve 6251 together with the water pressure of the incoming water to facilitate keeping the first slide valve 6251 in the closed state.

In one of the embodiments, as shown in FIGS. 13-17, the water storage valve drain pipe 624 comprises a first drain pipe 6241 and a second drain pipe 6242.

The first drain pipe 6241 is connected to the switching valve housing 6220 and in communication with the second recess 6222b, and the second drain pipe 6242 communicates the water storage cavity 6211 to the second recess 6222b.

The drain control valve 626 is in the first drain pipe 6241 or in the second drain pipe 6242.

In this embodiment, the second recess 6222b is used as a water cavity. The water storage valve drain pipe 624 comprises the first drain pipe 6241 and the second drain pipe 6242, and the switching valve housing 6220 is connected between the first drain pipe 6241 and the second drain pipe 6242. The first drain pipe 6241 is connected to the switching valve housing 6220, and the first drain pipe 6241 is in communication with the second recess 6222b. One end of the second drain pipe 6242 is in communication with the water storage cavity 6211, and the other end of the second drain pipe 6242 is in communication with the second recess 6222b.

When the drain control valve 626 is opened, water in the water storage cavity 6211 may be discharged through the second drain pipe 6242, the second recess 6222b, and the first drain pipe 6241. The first drain pipe 6241 may be in communication with the seat base overflow pipe 14 to drain water into the ceramic body for flushing.

The drain control valve 626 may be arranged in the first drain pipe 6241. In this structure, the water flow direction of the drained water is opposite to the acting direction of the second reset member 6262, and the second reset member 6262 is required to provide a larger resilient force to overcome the water pressure of the incoming water to avoid the second slide valve 6261 being opened by the water flow to ensure that the second slide valve 6261 can be closed.

In an embodiment, the drain control valve 626 is arranged in the second drain pipe 6242 as shown in FIGS. 14-16. In this structure, the water flow direction of the drained water is the same as the acting direction of the second reset member 6262, and the second reset member 6262 acts on the second slide valve 6261 together with the water pressure of the drained water, which facilitates keeping the second slide valve 6261 in the closed state.

In one of the embodiments, the inlet control valve 625 is arranged in the first inlet pipe 6231, and the drain control valve 626 is arranged in the second drain pipe 6242, and the closing direction of the inlet control valve 625 and drain control valve 626 is the same as the direction of water flow at the corresponding place, which can reduce the force of the reset member and facilitate the sealing.

In one of the embodiments, as shown in FIGS. 14-17, a seal ring 6224 is provided on the switching shaft 6222 on both sides of the first recess 6222a and on both sides of the second recess 6222b respectively to improve sealing performance to ensure that water in the first recess 6222a and the second recess 6222b does not flow out through the channel 6221.

In one of the embodiments, as shown in FIGS. 14-16, the water storage cavity 6211 comprises a lower water storage cavity 6211a and an upper water storage cavity 6211b, and the partition 6212 between the lower water storage cavity 6211a and the upper water storage cavity 6211b has a partition through hole 6213.

The water storage valve inlet pipe 623 and the water storage valve drain pipe 624 are in communication with the lower water storage cavity 6211a, respectively.

The lower water storage cavity 6211a has a floating valve 6214 for opening and closing the partition through hole 6213, and the upper water storage cavity 6211b is equipped with a water float 6215, and a connecting rod 6216 is connected between the floating valve 6214 and the water float 6215, and the connecting rod 6216 passes through the partition through hole 6213 with a clearance therebetween.

When water stored in the upper water storage cavity 6211b reaches a preset water level, the floating valve 6214 closes the partition through hole 6213.

In this embodiment, the water storage cavity 6211 is divided into the lower water storage cavity 6211a and the upper water storage cavity 6211b, with the partition 6212 having the partition through hole 6213 between them. The water storage valve inlet pipe 623 and water storage valve drain pipe 624 are connected to the lower water storage cavity 6211a, respectively.

The lower water storage cavity 6211a is equipped with the floating valve 6214 to automatically opening and closing the partition through hole 6213. The upper water storage cavity 6211b is equipped with the water float 6215, which is connected to the floating valve 6214 below through the connecting rod 6216 to drive the floating valve 6214 to move upward to seal the partition through hole 6213.

When water is stored and the water float 6215 rises a preset distance in the upper water storage cavity 6211b, the water float 6215 drives the floating valve 6214 to move upward to seal the partition through hole 6213, the pressure relief water in the drain valve pressure relief pipe 614 stops entering the water storage cavity 6211, the drain valve diaphragm 613 closes, and the drain valve drain pipe 612 automatically stops draining.

After the drain control valve 626 opens, the water in the lower water storage cavity 6211a is drained, the floating valve 6214 drops to open the partition through hole 6213, and the water float 6215 drops in the upper water storage cavity 6211b to prepare for the next water storage.

In one of the embodiments, as shown in FIGS. 13-16, a side of the upper water storage cavity 6211b has an overflow pipe 6217, and water flowing from the overflow pipe 6217 can flow into the seat base overflow pipe 14 through the pipe to clean the ceramic body.

As shown in FIG. 20, an embodiment of the application provides a toilet, which comprises a seat device according to any one of the embodiments above. The seat base of the seat device is mounted at the rear of the toilet body 7 (ceramic body).

In an embodiment, the toilet described in Embodiment 1-Embodiment 5 includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, a bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

The above technical solutions may be combined as required to achieve the best technical effect.

The above are merely the principle and the embodiments of the present disclosure. It should be pointed out that, for those having ordinary skill in the art, several other modifications may be made on the basis of the principle of the present disclosure, which should also be regarded as falling in the protection scope of the present disclosure.

Embodiment 2

The specific embodiments of the present disclosure should be further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

As shown in FIGS. 1 and 4-9, the seat assembly provided in an embodiment of the present disclosure comprises a mounting base 1 and a seat 2 connected to the mounting base 1 (e.g., a seat base) by a pivot shaft 3.

An adjustment hole 131 is provided on the left and right sides of a housing 13 (comprising e.g., a side plate) of the mounting base 1 respectively.

The pivot shaft 3 passes through the adjustment hole 131 and may be adjusted vertically in the adjustment hole 131.

A reset mechanism (e.g., an elastic member 32) for driving the pivot shaft 3 to move upward to reset is assembled between the mounting base 1 and the pivot shaft 3.

The present disclosure provides a seat assembly as a component in the seat and lid or cover plate of a toilet. The seat assembly comprises the mounting base 1, the seat 2, the pivot shaft 3 and the reset mechanism. The pivot shaft 3 is connected to a rear of the seat 2.

A long pivot shaft 3 may be provided at the rear of the seat 2, or a short pivot shaft 3 may be provided on the left and right sides of the rear of the seat 2 respectively, as required.

The housing 13 has adjustment holes 131 on the left and right sides of the mounting base 1, and the adjustment holes 131 may be bar-shaped holes or waist-shaped holes with the size in the height direction larger than the size in the forward and backward direction. The pivot shaft 3 passes through the adjustment hole 131 with a clearance therebetween and is adjustable by moving up and down in the adjustment hole 131. In an embodiment, the size of the adjustment hole 131 in the forward and backward direction is substantially equal to the diameter of the pivot shaft 3, which can avoid the pivot shaft 3 from wobbling forward and backward in the adjustment hole 131.

The reset mechanism is assembled between the pivot shaft 3 and the mounting base 1. When the seat 2 is not under pressure, the reset mechanism drives the pivot shaft 3 to move upward to a top of the adjustment hole 131 so that the rear of the seat 2 is in a higher position.

The reset mechanism may be a resilient reset mechanism or a piston reset mechanism, etc. The reset mechanism may be optionally mounted on the outside of the mounting base 1 or mounted in the mounting base 1.

In an embodiment, a resilient reset mechanism is selected as the reset mechanism, and the reset mechanism is mounted in the mounting base 1.

In an initial state, when the seat 2 is not under pressure from the user, the pivot shaft 3 is driven to move upward to the top of the adjustment hole 131 by the reset mechanism. At this time, the rear end of the seat 2 is in a higher position and will not contact the rear of the toilet body (ceramic body), and there is a certain distance between them to provide a cushion space.

When there is a user sitting on the seat 2, the seat 2 is under pressure and drives the pivot shaft 3 to move downward and overcome the acting force of the reset mechanism until the pivot shaft 3 reaches a bottom of the adjustment hole 131. At this time, the rear end of the seat 2 is in a lower position, and the rear end of the seat 2 is in contact with the rear of the toilet body (ceramic body). In the process, the reset mechanism provides a certain damping to slow down the descending of the rear end of the seat 2, thus providing a cushion effect and facilitating the user to gradually adapt to the hard contact between the seat 2 and the toilet body, thus enhancing the user experience.

The present disclosure provides the seat assembly with a cushion function, especially suitable for the elderly and children, capable of avoiding the discomfort caused by sitting violently on the seat 2.

Figure 6:
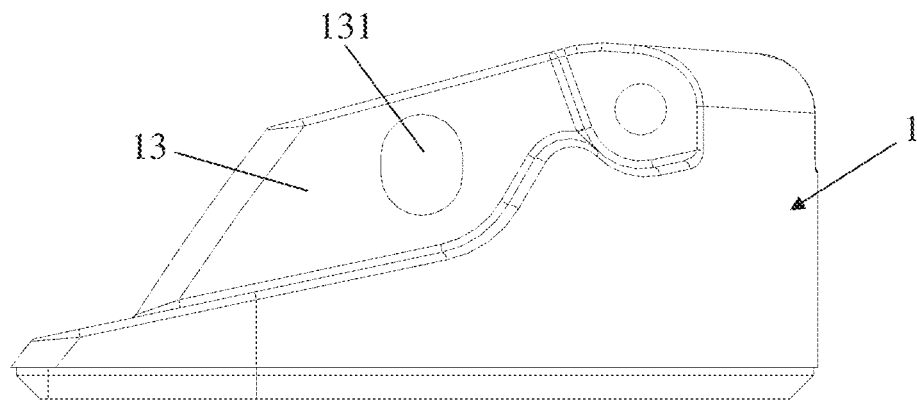
FIG. 6 is a schematic diagram of a side plate of the seat base with an adjustment hole provided in it.
Figure 7:
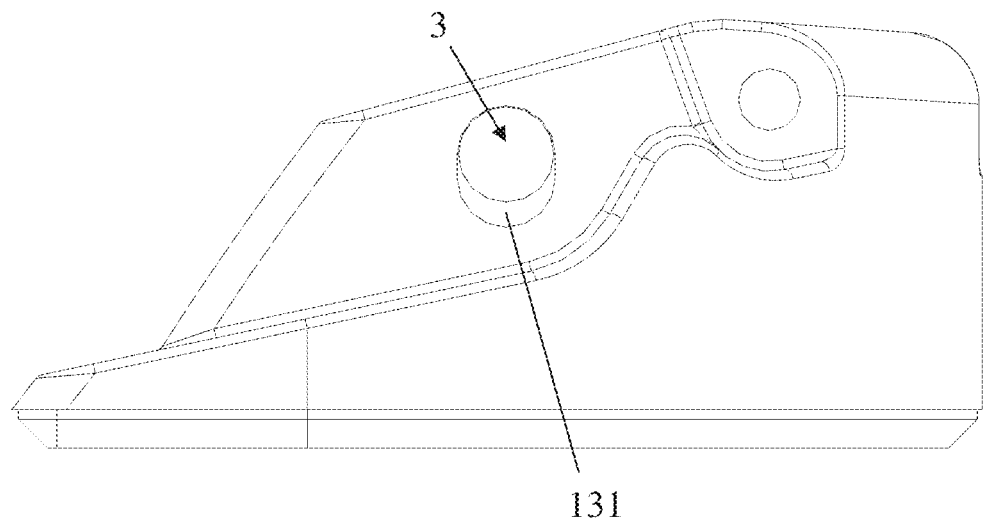
FIG. 7 is a schematic diagram of a pivot shaft in the adjustment hole when it is in an initial state.
Figure 8:
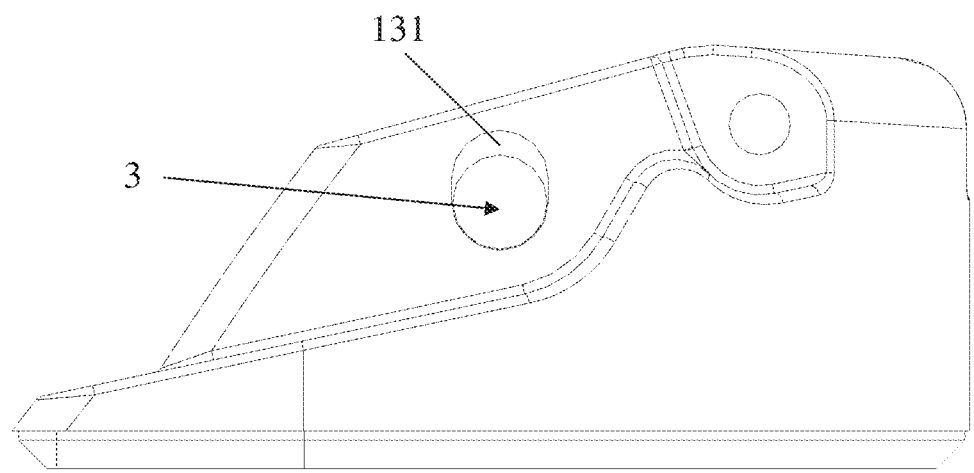
FIG. 8 is a schematic diagram of the pivot shaft in the adjustment hole when it is in a descending state.

In one of the embodiments, as shown in FIGS. 6-8, the adjustment hole 131 is a waist-shaped hole extending along the vertical direction, and its upper and lower ends are semicircular to facilitate assembly with the cylindrical pivot shaft 3.

Figure 9:
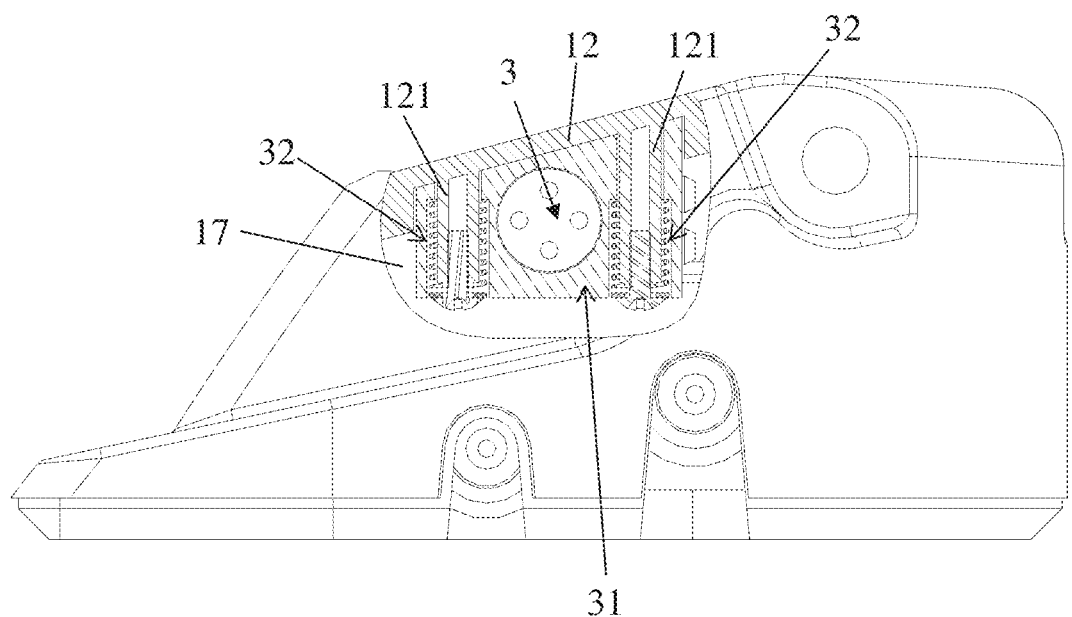
FIG. 9 is a partial sectional view of a second trigger end, a reset mechanism mounted in the seat base.

In one of the embodiments, as shown in FIG. 9, the mounting base 1 has a mounting cavity 17 (e.g., a guide groove) and the reset mechanism is in the mounting cavity 17, which prevents the user from seeing the reset mechanism from the outside.

In one of the embodiments, as shown in FIG. 9, the reset mechanism comprises a slider 31 (e.g., a second trigger end) and an elastic member 32. The slider 31 is assembled in the mounting cavity 17 and is capable of sliding up and down in the mounting cavity 17. The elastic member 32 is connected to the slider 31 and is capable of driving the slider 31 to slide upward to reset.

Figure 22:
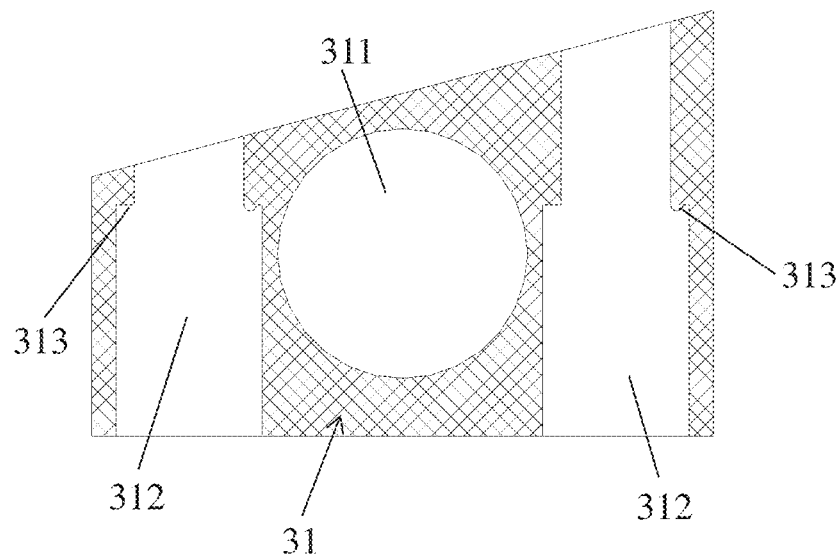
FIG. 22 is a sectional view of a slider.

In this embodiment, the reset mechanism comprises the slider 31 and the elastic member 32. As shown in FIG. 22, the slider 31 has a through hole 311, and the pivot shaft 3 passes through the through hole 311. the slider 31 is in clearance fit (e.g., engaged) in the mounting cavity 17, and the slider 31 is able to slide up and down in the mounting cavity 17. When the pivot shaft 3 moves upward, it drives the slider 31 to move upward in the mounting cavity 17. When the pivot shaft 3 moves downward, it will drive the slider 31 to move downward in the mounting cavity 17. The elastic member 32 is mounted in the mounting cavity 17, and one end of the elastic member 32 is connected to the slider 31, and the elastic member 32 is used to drive the slider 31 to slide upward and reset.

The elastic member 32 can be selected from the elastic sheet, spring and other elements that can store and release energy.

When the seat 2 is not under pressure, the elastic member 32 releases energy, and under the action of the elastic member 32 the slider 31 moves upward in the mounting cavity 17, and then drives the pivot shaft 3 to move upward in the adjustment hole 131 until it moves upward to the top of the adjustment hole 131, and the seat 2 is reset to the initial state.

When the seat 2 is under pressure, the seat 2 drives the pivot shaft 3 to move downward in the adjustment hole 131, and the pivot shaft 3 drives the slider 31 to move downward in the mounting cavity 17, and the elastic member 32 is stressed and accumulates energy.

In one embodiment, as shown in FIG. 9, the mounting cavity 17 has a guide member (e.g., a guide column) vertically extending, and the slider 31 is slidingly connected to the guide member to facilitate guiding the slider 31 to move up and down in the mounting cavity 17.

The guide member may be selected from a guide rail, guide slot, guide column, etc.

Figure 10:
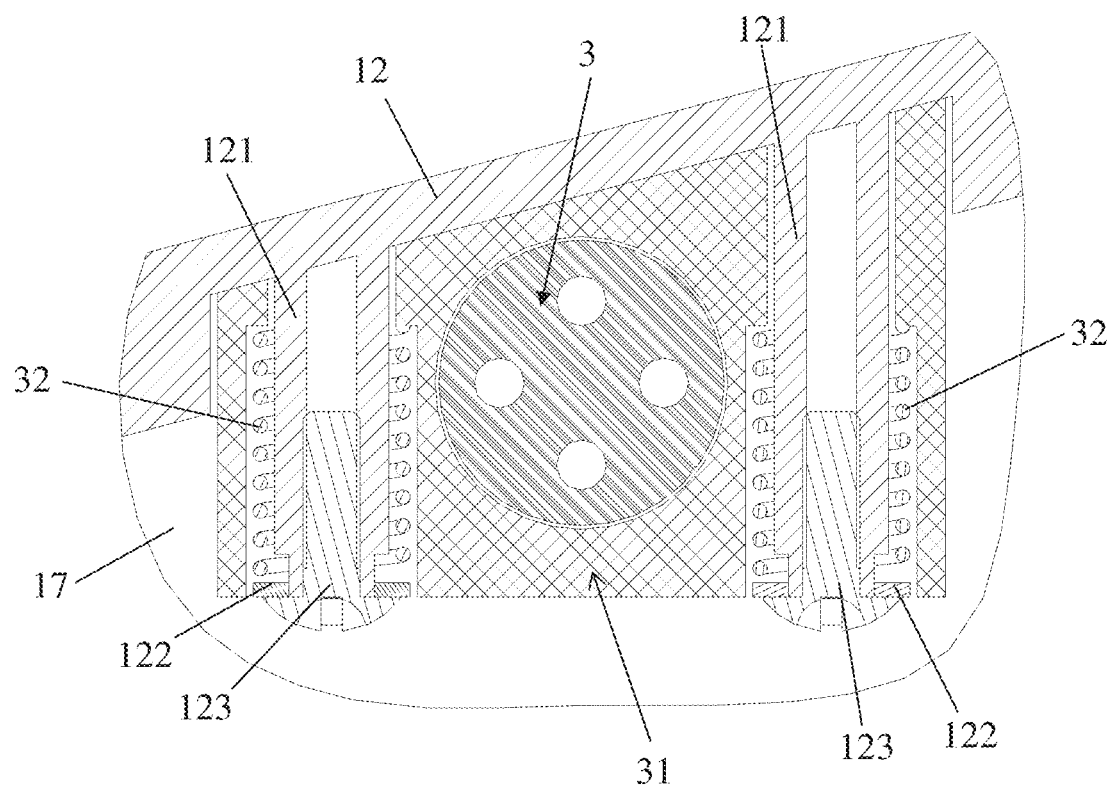
FIG. 10 is an enlarged view of the sectional area of FIG. 9.
Figure 21:
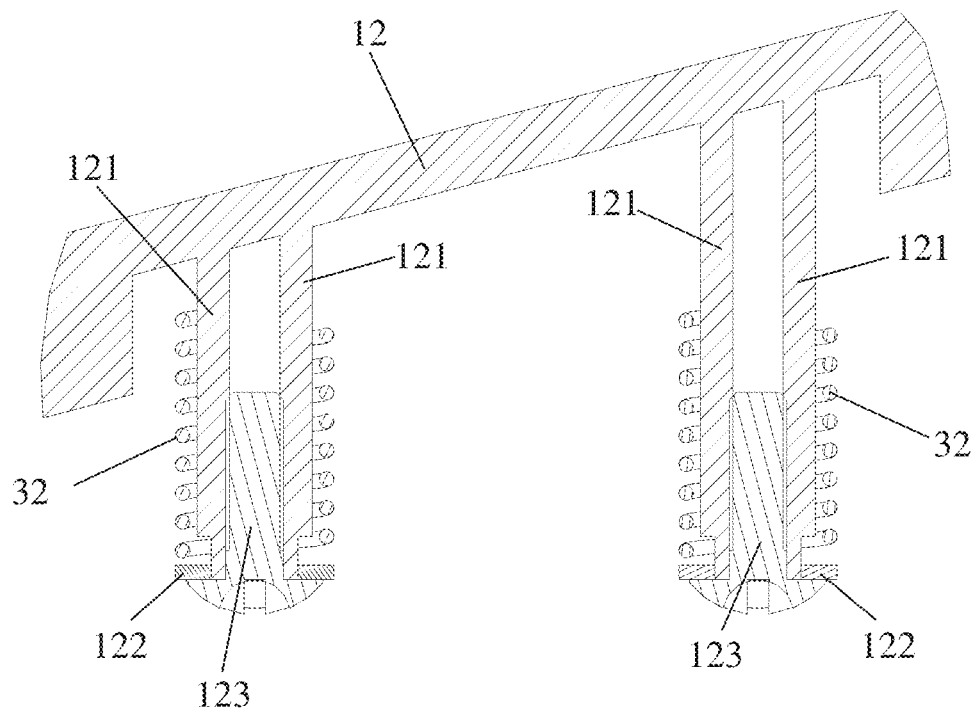
FIG. 21 is a schematic diagram of the assembly of a top plate, a guide column, a spring and a pad plate.

In one of the embodiments, as shown in FIGS. 10, 21, and 22, the guide member comprises at least one guide column 121. The slider 31 has an assembly hole 312 for fitting with the guide column 121. The guide column 121 is in clearance fit (e.g., engaged) with the assembly hole 312.

In this embodiment, the guide member uses a guide column 121, and more than one guide column 121 can be arranged as needed, the guide column 121 extending vertically in the mounting cavity 17. The slider 31 is provided with an assembly hole 312 accordingly. The guide column 121 is in clearance fit (e.g., engaged) with the assembly hole 312, thus guiding the slider 31 to move up and down.

If the guide column 121 is mounted on a bottom plate of the mounting base 1, the assembly hole 312 may be optionally provided as a blind hole with a downward opening or a through hole extending from top to bottom.

In one of the embodiments, as shown in FIG. 10 and FIG. 21, the elastic member 32 may be a spring, the spring is sleeved onto the guide column 121 such that the spring is compressed or elongated along the guide column 121, which prevents the spring from deviating from its position.

In one of the embodiments, as shown in FIG. 21 and FIG. 22, a hole wall of the assembly hole 312 has a step portion 313 for connecting one end of the spring, and one end of the guide column 121 has a pad plate 122 for connecting the other end of the spring.

The assembly hole 312 may be optionally provided as a step hole having a step portion 313 near a top position, and the upper end of the spring is connected to the step portion 313. As needed, a clamping groove may be provided in the step portion 313 to clamp the upper end of the spring.

A pad plate 122 is mounted at the lower end of the guide column 121 by screws 123, and the lower end of the spring is connected to the pad plate 123 to facilitate assembly of the spring.

In one of the embodiments, as shown in FIGS. 10, 21, and 22, the guide column 121 is connected to the top plate 12 of the mounting base 1 and extends downward, the assembly hole 312 runs through upper and lower surfaces of the slider 31, and the guide column 121 is inserted from a top opening of the assembly hole 312 into the assembly hole 312.

In this embodiment, the guide column 121 is integrally provided on a bottom surface of the top plate 12 of the mounting base 1, and the assembly hole 312 is a through hole extending from top to bottom, and the guide column 121 is inserted downwardly into the assembly hole 312 from its top. The assembly hole 312 is a through hole, and the lower end of the guide column 121 can extend beyond the assembly hole 312. The slider 31 will not interfere with the guide column 121, thus the vertically movement range of the pivot shaft 3 in the adjustment hole 131 will not be affected.

As shown in FIG. 20, the present disclosure provides a toilet comprising a toilet body 7 and the seat assembly according to any one of the embodiments above, the mounting base 1 being mounted at a rear of the toilet body 7.

The toilet provided by the present disclosure comprises the toilet body 5 and the seat assembly, and the mounting base 1 in the seat assembly is mounted on the rear of the toilet body 7.

The structure, construction and working principle of the seat assembly refer to the foregoing description of the seat assembly, which is not repeated herein.

The above technical solutions may be combined as required to achieve the best technical effect.

The above are merely the principle and the embodiments of the present disclosure. It should be pointed out that, for those having ordinary skill in the art, several other modifications may be made on the basis of the principle of the present disclosure, which should also be regarded as falling in the protection scope of the present disclosure.

Embodiment 3

The specific embodiments of the present disclosure is further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 23:
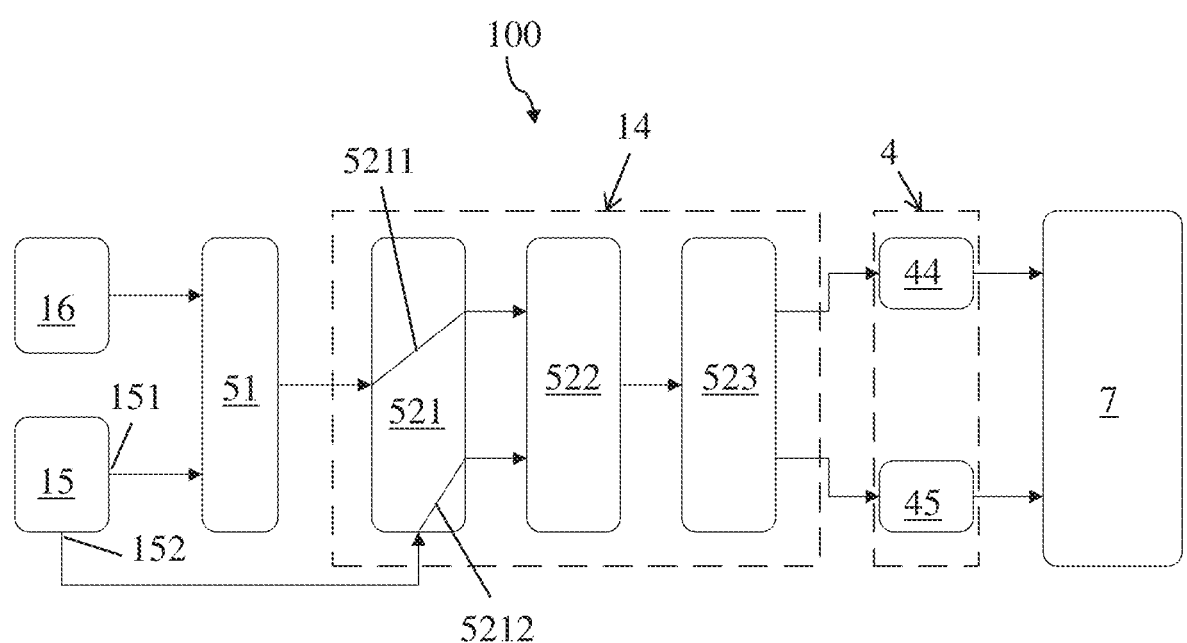
FIG. 23 a schematic diagram of a body cleaning system for a toilet provided by an embodiment of the present disclosure.

As shown in FIG. 23, an embodiment of the present disclosure provides a body cleaning system 100 for a toilet, comprising a cold water supply end 15 (e.g., cold water inlet end), a hot water supply end 16 (e.g., hot water inlet end), a temperature control valve 13, a water valve 52 (e.g., a temperature control system water valve), and a spray pipe 4.

A first cold water outlet 151 of the cold water supply end 15 is in communication with a cold water inlet of the temperature control valve 13, and a hot water outlet of the hot water supply end 16 is in communication with a hot water inlet of the temperature control valve 13. An outlet of the temperature control valve 13 is in communication with an inlet of the water valve 52, and an outlet of the water valve 52 is in communication with an inlet of the spray pipe 4.

The present disclosure provides a body cleaning system 100, which is mainly used in a toilet. The body cleaning system 100 comprises the cold water supply end 15, the hot water supply end 16, the temperature control valve 13, the water valve 52 and the spray pipe 4. The cold water supply end 15, the hot water supply end 16 and the temperature control valve 13 may be mounted in a mounting base of the seat device. The water valve 52 and the spray pipe 4 may be integrated in the seat or may be integrated in the mounting base.

The cold water supply end 15 and the hot water supply end 16 are inlet control valves respectively. The cold water supply end 15 has the first cold water outlet(s) 151, and the number of cold water outlets can be set according to the actual needs. The hot water supply end 16 has the hot water outlet(s), and the number of hot water outlets can be set according to actual needs.

The temperature control valve 13 is a temperature control valve capable of regulating water temperature, and can be selected from existing electric-type temperature control valves or mechanical-type temperature control valves. Temperature control valve 13 has the cold water inlet, hot water inlet and warm water outlet, which is used to mix the incoming hot water and cold water to form warm water with the desired temperature. The structure and the working principle of the temperature control valve 13 is not repeated herein.

The water valve 52 is used to connect waterways to transfer the warm water output from the temperature control valve 13 to each spray pipe 4. The spray pipe 4 is used for user to flush, which comprises the spray pipe and nozzle and other structures. The structure and the working principle of the spray pipe 4 is not repeated herein.

The inlet of the cold water supply end 15 is connected to an external cold water pipeline, and the first could water outlet 151 of the cold water supply end 15 is connected to the cold water inlet of the temperature control valve 13 through a water pipe (hose) to supply cold water to the temperature control valve 13.

The inlet of the hot water supply end 16 is connected to an external hot water pipeline, and the outlet of the hot water supply end 16 is connected to the hot water inlet of the temperature control valve 13 through a water pipe (hose) to supply hot water to the temperature control valve 13.

The temperature control valve 13 can mix the incoming cold water and hot water into warm water with preset temperature to achieve a constant temperature effect, which has a good temperature control effect, does not need fast heating, and is conducive to power saving.

The outlet of the temperature control valve 13 is connected to the inlet of the water valve 52 through a water pipe (hose) to supply warm water to the water valve 52. The outlet of the water valve 52 is connected to the inlet of the spray pipe 4 through a water pipe (hose) to supply warm water to each spray pipe 4 for the user to flush.

As a result, the present disclosure provides a body cleaning system for toilet does not need a heater, which saves electricity, and the adjustment of the temperature control valve 13 has a constant temperature function, improving the user experience.

In one of the embodiments, the temperature control valve 13 is a mechanical temperature control valve. The mechanical temperature control valve has a paraffin temperature package to feel temperature change of the mixed hot and cold water. When the temperature control valve 13 is set to a preset temperature, the paraffin temperature package automatically adjusts the ratio of the incoming hot water and the incoming cold water, so as to achieve the purpose of relatively constant temperature of the effluent water, and the temperature change can be controlled within ±2° C., achieving constant temperature function. Mechanical temperature control valve is generally used to control the water temperature at about 38±2° C.

In one of the embodiments, the temperature control valve 13 is a temperature controlled adjusting valve capable of adjusting the temperature, which can be manually operated or electrically operated, and the user can adjust the current water temperature according to actual needs. When the water temperature needs to be raised, the temperature controlled adjusting valve increases the amount of the incoming hot water, and reduces the amount of the incoming cold water. When the water temperature needs to be lowered, the temperature control valve reduces the amount of the incoming hot water entering and increases the amount of the incoming cold water.

The temperature control valve 13 can directly adopt the temperature controlled adjusting valve applied in water heaters and the heating field, and its specific working principle is not repeated herein.

In one of the embodiments, as shown in FIG. 23, the water valve 52 comprises a water mixing valve 522 and a switching valve 523 (e.g., spray pipe conversion valve).

The outlet of the temperature control valve 13 is in communication with the hot water inlet of the water mixing valve 522, a second cold water outlet 152 of the cold water supply end 15 is in communication with the cold water inlet of the water mixing valve 522, the outlet of the water mixing valve 522 is in communication with the inlet of the switching valve 523, and the outlet of the switching valve 523 is in communication with the inlet of the spray pipe 4.

In this embodiment, the water valve 52 comprises the water mixing valve 522 and the switching valve 523. The water mixing valve 522 is used to further mix warm water with cold water to meet the actual water needs of the user. The switching valve 523 is used to control the water supply into the spray pipe 4.

The water mixing valve 522 has the hot water inlet, cold water inlet and warm water outlet. The cold water supply end 15 comprises the second cold water outlet 152. The outlet of the temperature control valve 51 is connected to the hot water inlet of the water mixing valve 522 either directly or indirectly through a water pipe (hose) to achieve communication. The second cold water outlet 152 of the cold water supply end 15 is connected directly or indirectly through a water pipe (hose) to the cold water inlet of the water mixing valve 522 to achieve communication. The warm water output from the temperature control valve 51 and the cold water output from the cold water supply end 15 are mixed and cooled down in a cavity of the water mixing valve 522, and then output from the warm water outlet.

The switching valve 523 has one inlet and more than one outlet. The outlet of the water mixing valve 522 is connected directly or indirectly through a water pipe (hose) to the inlet of the switching valve 523. The number of the outlets of the switching valve 523 corresponds to the number of spray pipes 4, and each outlet of the switching valve 523 is connected to one spray pipe 4 through a water pipe (hose) to control the water supply of that spray pipe 4. The warm water output from the water mixing valve 522 is controlled and output to the spray pipe 4 by the switching valve 523.

In one of the embodiments, as shown in FIG. 23, the water valve 52 also comprises a waterway adapter valve 521 having a hot water pipeline 5211 and a cold water pipeline 5212.

An inlet of the hot water pipeline 5211 is in communication with the outlet of the temperature control valve 51, and an outlet of the hot water pipeline 5211 is in communication with the hot water inlet of the water mixing valve 522.

An inlet of the cold water pipeline 5212 is in communication with the second cold water outlet 152 of the cold water supply end 15, and an outlet of the cold water pipeline 5212 is in communication with the cold water inlet of the water mixing valve 522.

In this embodiment, the water valve 14 is provided with the waterway adapter valve 521, which has mutually independent hot water pipeline 5211 and cold water pipeline 5212, which is convenient to connect respective waterways of the temperature control valve 51, cold water supply end 15 and water mixing valve 522 of each water pipe together. The waterway adapter valve 521 is optionally mounted in a mounting base 1 (e.g., a seat base).

In one of the embodiments, as shown in FIG. 23 and FIG. 2, the spray pipe 4 comprises a front spray pipe 44 and/or a rear spray pipe 45.

The front spray pipe 44 and/or the rear spray pipe 45 are connected to the outlet of the water valve 52 through a water pipe, respectively.

In this embodiment, the spray pipe 4 may be configured to have one or a combination of both of the front spray pipe 44 and the rear spray pipe 45 as needed to meet different flushing needs.

The front spray pipe 44 is mounted in the front of the seat, and the rear spray pipe 45 is mounted in the mounting base at the rear end of the seat, which can realize the flushing of different parts of the user.

Specifically, the switching valve 523 has two outlet pipelines in it, and the front spray pipe 44 and the rear spray pipe 45 are separately connected to the two outlet pipes, respectively. The switching valve 523 can control opening and closing of the two outlet pipelines. When the user uses the front spray pipe 44, the switching valve 523 is controlled to supply the water to the front spray pipe 44, and stop supplying water to the rear spray pipe 45. When the user uses the rear spray pipe 45, the switching valve 523 is controlled to supply water to the rear spray pipe 45 and stop supplying water to the front spray pipe 44.

As shown in FIG. 1, the embodiment of the present disclosure provides a seat device 110 comprising a mounting base 1 having a mounting cavity, a seat 2 pivotally mounted on the mounting base 1, and a body cleaning system 100 for a toilet according to any one of the embodiments above.

The cold water supply end 15, the hot water supply end 16 and the temperature control valve 51 are mounted in the mounting cavity, respectively.

The water valve 52 is assembled with the seat 2 and/or the mounting base 1, and the spray pipe 4 is assembled with the seat 2 and/or the mounting base 1.

This embodiment provides a seat device 110 as a part of a toilet. The seat device 110 comprises the mounting base 1, the seat 2 and the body cleaning system 100 described above.

The rear end of the seat 2 is mounted by a pivot to the mounting base 1, which is used for mounting on the toilet body (ceramic body) of the toilet. The mounting base 1 has the mounting cavity in it for mounting the components.

The cold water supply end 15, the hot water supply end 16 and the temperature control valve 51 are mounted in the mounting cavity, respectively. The water valve 52 can optionally be assembled with the seat 2 and/or the mounting base 1, and the spray pipe 4 can optionally be assembled with the seat 2 and/or the mounting base 1.

The present disclosure provides a seat device 110 with a body cleaning system 100 that does not need to be equipped with a heater, which saves electricity, and the temperature control valve 51 is adjusted with a constant temperature function and has good temperature control, which improves the user experience.

In one of the embodiments, with reference to FIG. 23 and FIG. 2, the spray pipe 4 comprises the front spray pipe 44 and/or the rear spray pipe 45.

The front spray pipe 44 is assembled at the front end of the seat 2 and the rear spray pipe 45 is in the mounting cavity.

In this embodiment, the spray pipe 4 can be configured to have one or a combination of both the front spray pipe 44 and the rear spray pipe 45 as needed to meet different flushing needs.

The front spray pipe 44 is assembled in the front of the seat 2 for flushing from front to rear, and the rear spray pipe 45 is in the mounting cavity of the mounting base for flushing from rear to front, which can realize flushing of different parts of the user.

In one of the embodiments, as shown in FIG. 1 and FIG. 2, the front of the mounting base 1 has a guidance groove 111 for guiding the nozzle 41 of the rear spray pipe 45 to protrude obliquely downward, and a top surface of the nozzle 41 has a spray hole so that forward upward flushing can be achieved. The water inlet 42 of the rear spray pipe 45 is at the rear end.

In one of the embodiments, as shown in FIG. 2, the guidance groove 111 is provided in the middle of the front side edge of a bottom plate 11 of the mounting base 1, facilitating the structural arrangement.

As shown in FIG. 20, the embodiment of the present disclosure provides a toilet 120 comprising a toilet body 7 and the seat device 110 according to any one of the embodiments above. The mounting base 1 is mounted at the rear of the toilet body 7.

The toilet 120 provided by the present disclosure is a smart toilet, which comprises the toilet body 7 (ceramic body) and the seat device 110. The mounting base 1 of the seat device 110 is mounted at the rear of the toilet body 7.

The toilet 120 provided by the present disclosure does not need to be equipped with a heater for the body cleaning system 100, which saves electricity, and the adjustment of the temperature control valve 51 has a constant temperature function and has a good temperature control effect, which improves the user experience.

The above technical solutions may be combined as required to achieve the best technical effect.

The above are merely the principle and the embodiments of the present disclosure. It should be pointed out that, for those having ordinary skill in the art, several other modifications may be made on the basis of the principle of the present disclosure, which should also be regarded as falling in the protection scope of the present disclosure.

Embodiment 4

The specific embodiments of the present disclosure is further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

As shown in FIGS. 2, 11, and 12, a pre-flush system provided by an embodiment of the present disclosure comprises a spray pipe 4 and a drain valve 61.

The drain valve 61 has a drain valve inlet pipe 613 for connecting with a hot water inlet end 16, a drain valve outlet pipe 612 for supplying hot water to the spray pipe 4.

The drain valve 61 has a drain valve diaphragm 613 for controlling opening and closing of the drain valve outlet pipe 612.

The drain valve outlet pipe 612 is connected to the spray pipe 4.

The pre-flush system also comprises a control mechanism 62 for controlling the opening and closing of the drain valve diaphragm 613.

When the control mechanism 62 is in an initial state, the drain valve diaphragm 613 is in a closed state.

When the control mechanism 62 is in a triggered state, the drain valve diaphragm 613 is in an opened state.

The present disclosure provides a pre-flush system for use in a toilet, which can be mounted in a mounting base at a rear of a seat device, and a base 11 (e.g., a base plate) of the mounting base has the hot water inlet end 16 and a base overflow pipe 14 (e.g., a seat base overflow pipe). The hot water inlet end 16 is connected to a hot water pipeline to provide hot water or warm water for the toilet. The hot water referred to in this present disclosure is the opposite concept of cold water, and the water temperature may be about 38° C., suitable for users to flush. The base overflow pipe 14 is used to drain excess water into the ceramic body of the toilet.

The pre-flush system comprises the spray pipe 4, the drain valve 3 and the control mechanism 62. The spray pipe 4 has a nozzle 41, and the spray pipe 4 can be mounted on the base 11 or on a front or side of the seat. The spray pipe 4 is retractable. When the user uses the spray pipe 4, the spray pipe 4 is extended; in the normal state, the spray pipe 4 is in a retracted state. The spray pipe 4 is connected to the water supply system of the toilet, and the water supply system can supply hot water or warm water to the spray pipe 4. The description of the spray pipe 4 is not repeated herein.

When the user uses the spray pipe 4, the hot water in the spray pipe 4 may be cooled down to cold water, and the direct spraying will affect the user experience.

The present disclosure uses drain valve 3 and control mechanism 62 to provide a pre-flush function for spray pipe 4 to flush out the cold water (e.g., water residual) in the spray pipe 4 with hot water and fill the spray pipe 4 with hot water, before the user uses the spray pipe 4. When the user uses it, the nozzle 41 directly sprays hot water.

The drain valve 61 is mounted on the base 11.

The drain valve 61 has a drain valve inlet pipe 611 and a drain valve outlet pipe 612 connected to it, and the drain valve 61 has a drain valve diaphragm 613. The drain valve outlet pipe 612 is connected to an inlet end 21 on the spray pipe 4 through a water pipe for supplying hot water to the spray pipe 4. The drain valve diaphragm 613 can control opening and closing of the drain valve outlet pipe 612 in order to control the water supply from the drain valve outlet pipe 612 to the spray pipe 4.

The control mechanism 62 may be an electric control mechanism or a mechanical mechanism. The control mechanism 62 may be triggered to act to control opening and closing of the drain valve diaphragm 613, which in turn controls opening and closing of the drain valve outlet pipe 612. The control mechanism 62 may directly control the drain valve diaphragm 613 to act or indirectly control the drain valve diaphragm 613 to act. If the control mechanism 62 is an electric control mechanism or mechanical mechanism, a connecting rod is mounted on an output end of the electric control mechanism or mechanical mechanism, the drain valve diaphragm 613 is sleeved on the connecting rod, and the connecting rod drives the drain valve diaphragm 613 to act. The control mechanism 62 can also drive the drain valve diaphragm 613 to act by water pressure.

When the control mechanism 62 is in the initial state, the drain valve diaphragm 613 is in the closed state and the drain valve outlet pipe 612 is closed.

When the control mechanism 62 is in the triggered state, the drain valve diaphragm 613 is in the opened state and the drain valve outlet pipe 612 supplies hot water to the spray pipe 4 to flush out the cold water from the spray pipe 4.

When the user uses the toilet, the spray pipe 4 is in the retracted state before the spray pipe 4 is used. When the user triggers the control mechanism 62, the drain valve outlet pipe 612 supplies hot water to the spray pipe 4, and the hot water fills the spray pipe 4 to flush out the cold water in the spray pipe 4. The water in the spray pipe 4 can be drained out through the nozzle 41 and flow into the ceramic body. Because the water pressure of the drain valve outlet pipe 612 will not be too high, the water in the spray pipe 4 flows out slowly through the nozzle 41 instead of being sprayed out.

Thus, according to the pre-flush system provided by the present disclosure, when using the toilet, the user can trigger the control mechanism 62 as needed before flushing with the spray pipe 4, the warm water in the drain valve 61 flows into the spray pipe 4 to pre-flush out the cold water in the spray pipe 4, the cold water flushed out can be drained into the ceramic cylinder of the toilet and can play a role of cleaning, and when the user uses the spray pipe 4 later, the water sprayed from the spray pipe 4 is basically warm water, which enhancing the user experience.

In one of the embodiments, as shown in FIGS. 2, 11, and 12, the drain valve 61 also comprises a drain valve pressure relief pipe 614, and the control mechanism 62 is connected to the drain valve pressure relief pipe 614.

When the control mechanism 62 is in the initial state, the drain valve pressure relief pipe 614 is in a stopping drainage state.

When the control mechanism 62 is in the triggered state, the drain valve pressure relief pipe 614 is in a draining state.

In this embodiment, the water pressure is used to control the drain valve diaphragm 613 to open and close.

The drain valve 61 has an upper water cavity 615 and a lower water cavity 616. The drain valve outlet pipe 612 is mounted on the top of the drain valve 61, and an inlet of drain valve outlet pipe 612 has a circle of baffle rib 617 extending downward. The drain valve diaphragm 613 is in the upper water cavity 615 and lower water cavity 616, and drain valve diaphragm 613 has a communication hole 6131.

When the drain valve pressure relief pipe 614 does not drain outward, the water in the upper water cavity 615 enters the lower water cavity 616, gradually making the water pressure in the upper water cavity 615 and the water pressure in the lower water cavity 616 balance, such that the drain valve diaphragm 613 seals the baffle rib 617, and the drain valve outlet pipe 612 does not drain.

When the drain valve pressure relief pipe 614 drains outward, the water pressure in the lower water cavity 616 decreases, the drain valve diaphragm 613 leaves the baffle rib 617 downward, and the drain valve outlet pipe 612 drains.

The control mechanism 62 is used to control the drain valve pressure relief pipe 614 to drain or stop draining, and the control mechanism 62 may be a valve structure connected to the drain valve pressure relief pipe 614.

When the control mechanism 62 is in the initial state, the drain valve pressure relief pipe 614 does not drain and the drain valve outlet pipe 612 does not drain.

When the control mechanism 62 is in the triggered state, the drain valve pressure relief pipe 614 drains and the drain valve outlet pipe 612 drains.

The water drained from the drain valve pressure relief pipe 614 can flow into the base overflow pipe 14 through the pipe to clean the ceramic body.

In one of the embodiments, as shown in FIGS. 13-17, the control mechanism 62 comprises a water storage valve 621 having a water storage cavity 6211.

The water storage valve 621 is connected to a water storage valve inlet pipe 623 and a water storage valve drain pipe 624 that are in communication with the water storage cavity 6211, with an inlet control valve 625 provided in the water storage valve inlet pipe 623 and a drain control valve 626 provided in the water storage valve drain pipe 624.

The water storage valve inlet pipe 623 is in communication with the drain valve pressure relief pipe 614.

When the control mechanism 62 is in the initial state, the inlet control valve 625 is in a closed state and the drain control valve 626 is in an opened state.

When the control mechanism 62 is in the triggered state, the inlet control valve 625 is in an opened state and the drain control valve 626 is in a closed state.

In this embodiment, the control mechanism 62 uses a water storage valve 621 with a time delay function to extend the drainage time of the drain valve outlet pipe 612.

In this embodiment, the control mechanism 62 comprises the water storage valve 621, the water storage valve inlet pipe 623, the water storage valve drain pipe 624, the inlet control valve 625 and the drain control valve 626.

The water storage valve 621 has the water storage cavity 6211, and the water storage valve inlet pipe 623 and the water storage valve drain pipe 624 are in communication with the water storage cavity 6211, respectively. The inlet control valve 625 is mounted in the water storage valve inlet pipe 623 to control opening and closing of the water storage valve inlet pipe 623. The drain control valve 626 is mounted in the water storage valve drain pipe 624 to control the opening and closing of the water storage valve drain pipe 624. The inlet control valve 625 and the drain control valve 626 are opened and closed alternately.

The water storage valve inlet pipe 623 is in communication with the drain valve pressure relief pipe 614, and the two can be directly connected or indirectly connected through the pipe.

If the inlet control valve 625 and drain control valve 626 are electromagnetic valves, they are controlled by the electric control mechanism in the control mechanism 62. If the inlet control valve 625 and drain control valve 626 are mechanical valves, they are controlled by the mechanical mechanism in the control mechanism 62.

When the control mechanism 62 is in the initial state, the inlet control valve 625 is in the closed state, the water storage valve inlet pipe 623 is closed, then the drain valve pressure relief pipe 614 does not drain, the drain valve diaphragm 613 is closed, and the drain valve outlet pipe 612 does not drain. At this time, the drain control valve 626 is in the opened state and the water storage valve drain pipe 624 drains the water in the water storage cavity 6211 to the preset low water level, preparing for the next water storage. The water storage valve drain pipe 624 is in communication with the base overflow pipe 14, and the water drained from the water storage valve drain pipe 624 can flow into the base overflow pipe 14 through the pipe to clean the ceramic body.

When the control mechanism 62 is in the triggered state, the inlet control valve 625 is in the opened state, the water storage valve inlet pipe 623 is opened, then the drain valve pressure relief pipe 614 drains, the drain valve diaphragm 613 is opened, and the drain valve outlet pipe 612 drains. At this time, the drain control valve 626 is in the closed state to store water for the water storage cavity 6211. When water stored in the water storage cavity 6211 reaches the preset high water level, water no longer enters the water storage cavity 6211, and the inlet control valve 625 is closed. In this process, the time taken by the water in the water storage cavity 6211 to rise from the low water level to the high water level is a delay time, which can be set according to actual needs. The delay time is basically the drainage time of the drain valve outlet pipe 612. The delay time is determined by the volume of the water storage cavity 6211 and the water flow in the water storage valve inlet pipe 623.

The height, installation method and installation position of the water storage valve inlet pipe 623 and the water storage valve drain pipe 624 can be set according to actual needs, and only one or two installation modes are shown in the attached drawings, which does not mean that such installation is inevitable.

In an embodiment, the water storage valve drain pipe 624 is in communication with a bottom of the water storage cavity 6211, and the water storage valve inlet pipe 623 is in communication with a top of the water storage cavity 6211.

In one of the embodiments, as shown in FIGS. 13-17, the control mechanism 62 also comprises a switching valve 622 connected to a water storage valve inlet pipe 623 and a water storage valve drain pipe 624.

The switching valve 622 comprises a switching valve housing 6220 having a channel 6221 and a switching shaft 6222 that is in clearance fit (e.g., engaged) with the channel 6221. The switching shaft 6222 is capable of alternately triggering the drain control valve 626 and the inlet control valve 625.

With the switching shaft 6222 in an initial position, the switching shaft 6222 triggers the drain control valve 626, and the drain control valve 626 is in the opened state.

When the switching shaft 6222 is in a triggered position, the switching shaft 6222 triggers the inlet control valve 625, and the inlet control valve 625 is in the opened state.

In this embodiment, the switching valve 622 uses the switching shaft 6222 to alternately trigger the inlet control valve 625 and the drain control valve 625.

The switching valve 622 has a channel 6221 vertically extending in the switching valve 622, and a main body portion of the switching shaft 6222 is in clearance fit (e.g., engaged) with the channel 6221. An upper end of the switching shaft 6222 is above the switching valve housing 6220 and is used to be triggered by pressing. When the switching shaft 6222 in the initial position, the upper end of the switching shaft 6222 is in a higher position above the switching valve housing 6220. After the switching shaft 6222 is triggered by a press, the upper end of the switching shaft 6222 is in a lower position above the switching valve housing 6220.

The switching shaft 6222 has a triggering or driving portion for triggering the inlet control valve 625 and the drain control valve 626, which may be a protrusion, a recess or a telescopic element, etc., provided on the switching shaft 6222.

The water storage valve inlet pipe 623 and the water storage valve drain pipe 624 are each connected to the switching valve housing 6220 and in communication with the channel 6221. Therefore, when the switching shaft 6222 is moved to the corresponding position, the triggering/driving portion on the switching shaft 6222 can trigger the inlet control valve 625 or the drain control valve 626. When the inlet control valve 625 is triggered, the inlet control valve 625 opens the water storage valve inlet pipe 623. When the drain control valve 626 is triggered, the drain control valve 626 opens the water storage valve drain pipe 624.

In this case, when the switching shaft 6222 is in the initial position, the switching shaft 6222 triggers the drain control valve 626 to open, and the inlet control valve 625 is not triggered and therefore remains closed, and the water storage cavity 6211 is in the draining state.

When the switching shaft 6222 is pressed to the triggered position, the switching shaft 6222 triggers the inlet control valve 625 to open, and the inlet control valve 625 is not triggered and therefore remains closed, and the water storage cavity 6211 is in the water storage state.

In this arrangement, the switching shaft 6222 controls the alternate opening and closing of the inlet control valve 625 and the drain control valve 626 to control the water storage and drainage functions of the water storage cavity 6211.

In one of the embodiments, a switching shaft reset member 6223 for driving the switching shaft 6222 to reset to the initial position is connected between the switching valve housing 6220 and the switching shaft 6222 as shown in FIGS. 13-17. The switching shaft reset member 6223 is connected between the switching shaft 6222 and the top of the switching valve housing 6220 for driving the switching shaft 6222 to move upward to the initial position to reset. The switching valve housing 6220 may be a spring.

In one of the embodiments, as shown in FIGS. 14-19, the inlet control valve 625 comprises a first slide valve 6251 and a first reset member 6252 for driving the first slide valve 6251 to reset to a closed state.

The drain control valve 626 comprises a second slide valve 6261 and a second reset member 6262 for driving the second slide valve 6261 to reset to a closed state.

When the switching shaft 6222 in the initial position, the first slide valve 6251 is in the closed state and the second slide valve 6261 is driven to open by the switching shaft 6222.

When the switching shaft 6222 is in the triggered position, the second slide valve 6261 is in the closed state and the first slide valve 6251 is driven to open by the switching shaft 6222.

In this embodiment, both the inlet control valve 625 and the drain control valve 626 adopt a mechanical slide valve structure as follows:

As shown in FIG. 18, the inlet control valve 625 comprises the first slide valve 6251 and the first reset member 6252. The first slide valve 6251 is slidably mounted in the water storage valve inlet pipe 623. A first through hole 6220*a* is provided in the switching valve housing 6220, and the water storage valve inlet pipe 623 is connected to the first through hole 6220*a*, thereby is in communication with the channel 6221. One end of the water storage valve inlet pipe 623 near the first through hole 6220*a* has a first stop portion 6233, and a seal ring can be provided on the first stop portion 6233 as needed.

The first slide valve 6251 comprises a thicker first slide valve body 6251*a* and a first slide valve rod 6251*b* connected to the first slide valve body 6251*a*, the first slide valve rod 6251*b* extending toward and through the first through hole 6220*a*. A first step portion 6251*c* is formed at the connection of the first slide valve rod 6251*b* and the first slide valve body 6251*a*. When the first slide valve 6251 is in the closed sate, the first step 6251*c* is in contact with and seals the first stop 6233, thereby closing the water storage valve inlet pipe 623.

The first reset member 6252 is connected to the first slide valve body 6251*a* for driving the first slide valve 6251 toward the side of the switching valve housing 6220 to enable the opened first slide valve 6251 to automatically reset to the closed position. The first reset member 6252 may be a spring.

As shown in FIG. 19, the drain control valve 626 comprises the second slide valve 6261 and the second reset member 6262. the second slide valve 6261 is slidably mounted in the water storage valve drain pipe 624. A second through hole 6220*b* is provided in the switching valve housing 6220, and the water storage valve drain pipe 624 is connected to the second through hole 6220*b*, thereby is in communication with the channel 6221. The water storage valve drain pipe 624 has a second stop portion 6243 at one end near the second through hole 6220*b*, and a seal ring may be provided on the second stop portion 6243 as needed.

The second slide valve 6261 comprises a thicker second slide valve body 6261*a* and a second slide valve rod 6261*b* connected to the second slide valve body 6261*a*, the second slide valve rod 6261*b* extending toward and through the second through hole 6220*b*. A second step portion 6261*c* is formed at the connection of the second slide valve rod 6261*b* and the second slide valve body 6261*a*. When the second slide valve 451 is in the closed state, the second step portion 6261*c* is in contact with and seals the second stop portion 6243, thereby closing the water storage valve drain pipe 624.

The second reset member 6262 is connected to the second slide valve body 6261*a* for driving the second slide valve 6261 toward the side of the switching valve housing 6220 to enable the opened second slide valve 6261 to automatically reset to the closed position. The second reset member 6262 may be a spring.

When the switching valve 622 is in the initial position:

Under the action of the first reset member 6252, the first slide valve rod 6251*b* extends into the channel 6221 through the first through hole 6220*a*, the first step portion 6251*c* is in contact with the first stop portion 6233 and forms a seal therebetween, and the first slide valve 6251 closes the water storage valve inlet pipe 623 and will not supply water to the water storage cavity 411.

The triggering/driving portion of the switching shaft 6222 contacts and cooperates with the second slide valve rod

6261b of the second slide valve 6261 and overcomes the acting force of the second reset member 6262 to push the second slide valve rod 6261b backward from the channel 6221 so that the second step portion 6261c is separated from the second stop portion 6243, the water storage valve drain pipe 624 is opened, and the water storage cavity 411 can be drained.

When the switching valve 622 is in the triggered position:

The triggering/driving portion of the switching shaft 6222 contacts and cooperates with the first slide valve rod 6251b of the first slide valve 6251, and overcomes the acting force of the first reset member 6252 to push the first slide valve rod 6251b backward from the channel 6221, so that the first step portion 6251c is separated from the first stop portion 6233, the water storage valve inlet pipe 623 is opened, and the water storage cavity 6251 can store water.

Under the action of the second reset member 6262, the second slide valve rod 6261b extends into the channel 6221 through the second through hole 6220b, the second step portion 6261c contacts and seals the second stop portion 6243, the second slide valve 6261 closes the water storage valve drain pipe 624, and the water storage cavity 411 does not drain.

In one of the embodiments, as shown in FIGS. 14-17, a first recess 6222a for accommodating an end portion of the first slide valve 6251 and a second recess 6222b for accommodating an end portion of the second slide valve 6261 are provided at intervals on the switching shaft 6222.

When the switching shaft 6222 is in the initial position, one end of the first slide valve 6251 is in the first recess 6222a and one end of the second slide valve 6261 is in contact with a circumferential surface of the switching shaft 6222.

When the switching shaft 6222 is in the triggered position, one end of the second slide valve 6261 is in the second recess 6222b and one end of the first slide valve 6251 is in contact with the circumferential surface of the switching shaft 6222.

In this embodiment, the switching shaft 6222 is provided at intervals with the first recess 6222a and the second recess 6222b, and the first recess 6222a and the second recess 6222b may be a circular groove provided on the switching shaft 6222. The first recess 6222a is for accommodating the end portion of the first slide valve 6251 and the second recess 6222b is for accommodating the end portion of the second slide valve 6261.

When the switching shaft 6222 is in the initial position, the first recess 6222a is aligned with the first through hole 6220a, and the end portion of the first slide valve 6251 (i.e., one end of the first slide valve rod 6251b) is inserted into the first recess 6222a through the first through hole 6220a. At this time, the first step portion 6251c is made to contact and seal the first stop portion 6233 under the action of the first reset member 6252, and the first slide valve 6251 closes the water storage valve inlet pipe 623.

When the switching shaft 6222 is in the initial position, the second recess 6222b is staggered from the second through hole 6220b, the end portion of the second slide valve 6261 (i.e., one end of the second slide valve rod 6261b) leaves the second recess 6222b and contacts the circumferential surface or the protrusion of the switching shaft 6222, thereby driving the second slide valve 6261 to compress the second reset member 6262 and causing the second step portion 6261c to separate from the second stop portion 6243, and the second slide valve 6261 to opens, opening the water storage valve drain pipe 624.

When the switching shaft 6222 is in the triggered state, the first recess 6222a is staggered from the first through hole 6220a, and the end portion of the first slide valve 6251 (i.e., one end of the first slide valve rod 6251b) leaves the first recess 6222a and contacts the circumferential surface or protrusion of the switching shaft 6222, thereby driving the first slide valve 6251 to compress the first reset member 6252 and causing the first step portion 6251c to separate from the first stop portion 6233, and the first slide valve 6251 to open, opening the water storage valve inlet pipe 623.

When the switching shaft 6222 is in the triggered state, the second recess 6222b is aligned with the second through hole 6220b and the end portion of the second slide valve 6261 (i.e., one end of the second slide valve rod 6261b) is inserted into the second recess 6222b through the second through hole 6220b. At this time, the second step portion 6261c is made to contact and seal the second stop portion 6243 under the action of the second reset member 6262, and the second slide valve 6261 closes the water storage valve drain pipe 624.

Figure 13:
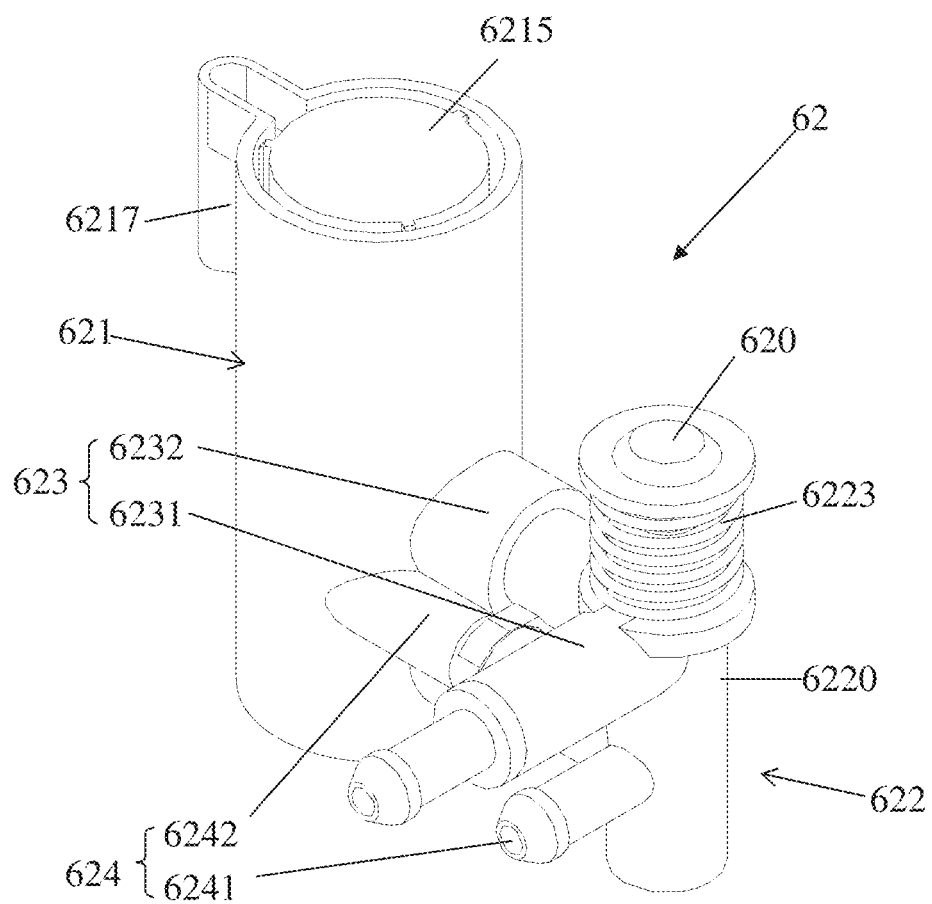
FIG. 13 is a stereoscopic view of a control mechanism.

In one of the embodiments, as shown in FIGS. 13, 16, and 17, the water storage valve inlet pipe 623 comprises a first inlet pipe 6231 and a second inlet pipe 6232.

The first inlet pipe 6231 communicates the drain valve pressure relief pipe 614 to the first recess 6222a, and the second inlet pipe 6232 communicates the water storage cavity 411 to the first recess 6222a.

The inlet control valve 625 is in the first inlet pipe 6231 or in the second inlet pipe 6232.

In this embodiment, the first recess 6222a is used as a water cavity. The water storage valve inlet pipe 42 comprises the first inlet pipe 6231 and the second inlet pipe 6232, and the switching valve housing 6220 is connected between the first inlet pipe 6231 and the second inlet pipe 6232. The first inlet pipe 6231 is in communication with the drain valve pressure relief pipe 614, and the first inlet pipe 6231 is also in communication with the first recess 6222a. One end of the second inlet pipe 6232 is in communication with the water storage cavity 6211, and the other end of the second inlet pipe 6232 is in communication with the first recess 6222a.

When the inlet control valve 625 is opened, water in the drain valve pressure relief pipe 614 can enter the water storage cavity 411 through the first inlet pipe 6231, the first recess 6222a and the second inlet pipe 6232.

As shown in FIG. 14 and FIG. 15, the inlet control valve 625 may be arranged in the second inlet pipe 6232. In this structure, the water flow direction of the incoming water is opposite to the acting direction of the first reset member 6252, and the first reset member 6252 is required to provide a large elastic force to overcome the water pressure of the incoming water to avoid the first slide valve 6251 from being opened by the water flow to ensure that the first slide valve 6251 can be closed.

In an embodiment, the inlet control valve 625 is arranged in the first inlet pipe 6231 as shown in FIG. 16 and FIG. 17. In this structure, the water flow direction of the incoming water is the same as the acting direction of the first reset member 6252, and the first reset member 6252 acts on the first slide valve 6251 together with the water pressure of the incoming water to facilitate keeping the first slide valve 6251 in the closed state.

In one of the embodiments, as shown in FIGS. 13-16, the water storage valve drain pipe 624 comprises a first drain pipe 6241 and a second drain pipe 6242.

The first drain 6241 is connected to the switching valve housing 6220 and in communication with the second recess 6222b, and the second drain pipe 6242 communicates the water storage cavity 411 to the second recess 6222b.

The drain control valve 626 is in the first drain pipe 6241 or in the second drain pipe 6242.

In this embodiment, the second recess 6222b is used as a water cavity. The water storage valve drain pipe 624 comprises the first drain pipe 6241 and the second drain pipe 6242, and the switching valve housing 6220 is connected between the first drain pipe 6241 and the second drain pipe 6242. The first drain pipe 6241 is connected to the switching valve housing 6220, and the first drain pipe 6241 is in communication with the second recess 6222b. One end of the second drain pipe 6242 is in communication with the water storage cavity 411 and its other end is in communication with the second recess 6222b.

When the drain control valve 626 is opened, water in the water storage cavity 411 can be drained through the second drain pipe 6242, the second recess 6222b, and the first drain pipe 6241. The first drain pipe 6241 may be in communication with the base overflow pipe 14 to drain water into the ceramic body for flushing.

The drain control valve 626 may be arranged in the first drain pipe 6241. In this structure, the water flow direction of the drained water is opposite to the acting direction of the second reset member 6262, and the second reset member 6262 is required to provide a larger elastic force to overcome the water pressure of the incoming water to avoid the second slide valve 6261 being opened by the water flow to ensure that the second slide valve 6261 can be closed.

In an embodiment, as shown in FIGS. 14-16, the drain control valve 626 is arranged in the second drain pipe 6242. In this structure, the water flow direction of the drained water is the same as the acting direction of the second reset member 6262, and the second reset member 6262 acts on the second slide valve 6261 together with the water pressure of the drained water to facilitate keeping the second slide valve 6261 in the closed state.

In one of the embodiments, the inlet control valve 625 is arranged in the first inlet pipe 6231 and the drain control valve 626 is arranged in the second drain pipe 6242, and the closing direction of the inlet control valve 625 and the drain control valve 626 is in the same direction as the water flow at the corresponding place, which can reduce the force of the reset member and facilitate the sealing.

In one of the embodiments, as shown in FIGS. 14-17, a seal ring 6224 is provided on the switching shaft 6222 on both sides of the first recess 6222a and both sides of the second recess 6222b respectively to improve the sealing performance to ensure that water in the first recess 6222a and the second recess 6222b does not flow out through the channel 4211.

In one of the embodiments, as shown in FIG. 14 and FIG. 15, a top plate 6212 (e.g., a partition) of the water storage cavity 6211 has a water storage cavity drainage hole 6213 (e.g., a partition through hole), and the water storage cavity 6211 has a floating valve 6214 for opening and closing the water storage cavity drainage hole 6213.

When water stored in the water storage cavity 6211 reaches a preset water level, the floating valve 6214 closes the water storage cavity drainage hole 6213.

In this embodiment, the water storage cavity drainage hole 6213 is automatically opened and closed by providing the floating valve 6214 in the water storage cavity 411. When the water stored in the water storage cavity 6211 reaches a preset water level (high water level), the floating valve 6124 floats up and closes the water storage cavity drainage hole 6213, the pressure relief water in the drain valve pressure relief pipe 614 stops entering the water storage cavity 6211, the drain valve diaphragm 613 is closed, and the drain valve outlet pipe 612 automatically stops draining.

After the drain control valve 626 is opened, the water in the water storage cavity 411 is drained, and the floating valve 6214 drops to open the water storage cavity drainage hole 6213.

In one of the embodiments, as shown in FIGS. 13-15, the water storage valve 621 also comprises a water tank 414 above the water storage cavity 6211, with a water float 6215 provided in the water tank 414.

A connecting rod 6216 is connected between the floating valve 6214 and the water float 6215, and the connecting rod 6216 passes through the water storage cavity drainage hole 6213 with a clearance therebetween.

In this embodiment, the water tank 414 is arranged above the water storage cavity 411 for configuring the water float 6215. The water float 6215 has a large volume and buoyancy. The water float 6215 is connected to the floating valve 6214 below through the connecting rod 6216, which helps drive the floating valve 6214 to move upward to seal the water storage cavity drainage hole 6213.

In this embodiment, the water in the water storage cavity 411 is always full, the water level changes in the water tank 414.

When the water float 6215 rises to a preset distance in the water tank 414, the water float 6215 drives the floating valve 6214 to move upward to seal the water storage cavity drainage hole 6213.

In one of the embodiments, as shown in FIGS. 13-15, a side of the water tank 414 has an overflow pipe 6217, and water flowing from the overflow pipe 6217 can flow into the base overflow pipe 14 to clean the ceramic body.

An embodiment of the present disclosure provides a toilet comprising a pre-flush system according to any of the embodiments above. The pre-flush system may be mounted in the seat device of the toilet.

The above technical solutions may be combined as required to achieve the best technical effect.

Embodiment 5

Figure 24:
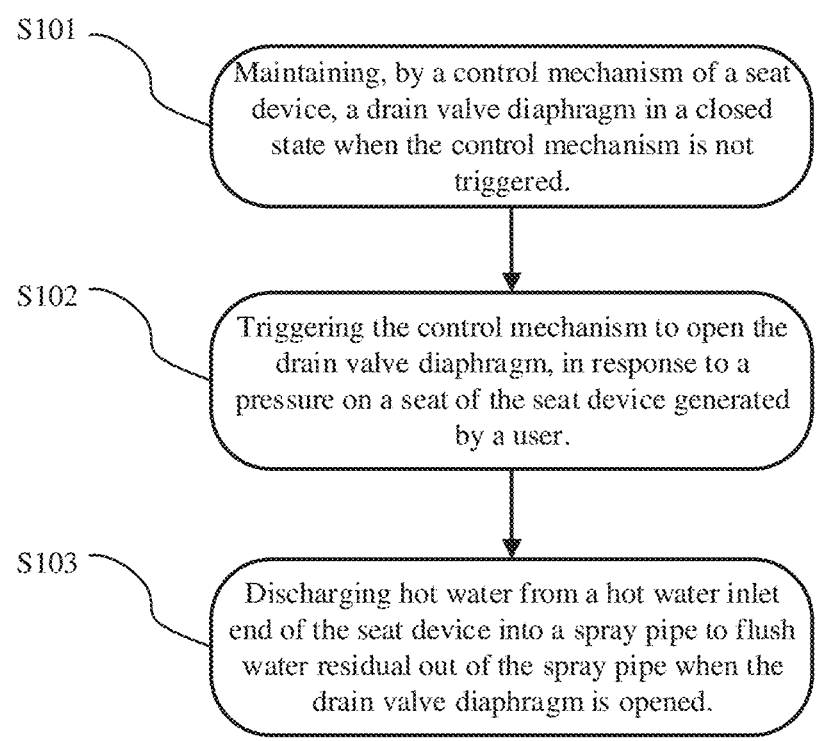
FIG. 24 is a flow chart of a method for flushing water residual out of a spray pripe by using a seat device according to an example of the present disclosure.

FIG. 24 is a flow chart of a method for flushing water residual out of a spray pipe by using a seat device according to an example of the present disclosure. The seat device used in the method may be the seat device according to Embodiment 1-Embodiment 4 and may be configured to perform an operation, function, or the like as described in the present disclosure.

At act S101, the control mechanism 62 of the seat device maintains the drain valve diaphragm 613 in the closed state when the control mechanism 62 is not triggered.

Specifically, as noted above, the rest mechanism maintains the first trigger end 620 of the control mechanism 62 spaced apart from the second trigger end 31 of the pivot shaft 3. In an initial state, that is, when the seat 2 is not under pressure from the user, the pivot shaft 3 is driven to move upwardly to the top of the adjustment hole 131 by the reset mechanism 32. At this time, a rear end of the seat 2 is in a higher position, and the rear end of the seat 2 does not contact the rear of the toilet body 7 (ceramic body), and there is a certain distance between them to provide a cushion space.

The control mechanism 62 controls the drain valve pressure relief pipe 614 to stop discharging water into the toilet body 7 so as to generate the balanced pressure in the drain valve 61. The drain valve diaphragm 613 seals the baffle rib 617 in the drain valve 61 in response to the balanced pressure. When the drain valve pressure relief pipe 614 does not drain outward, the water in the upper water cavity 615 enters the lower water cavity 616, gradually making the water pressure in the upper water cavity 615 and the water pressure in the lower water cavity 616 balance, such that the drain valve diaphragm 613 seals the baffle rib 617, and the drain valve outlet pipe 612 does not drain.

At act S102, the control mechanism 62 is triggered to open the drain valve diaphragm 613, in response to the pressure on the seat 2 of the seat device generated by the user.

Specifically, as noted above, the pivot shaft 3 is moved downwards until the second trigger end 31 of the pivot shaft 3 contacts the first trigger end 620 of the control mechanism 62 to trigger the control mechanism 62, in response to the pressure on the seat 2 of the seat device generated by the user. When there is a user sitting on the seat 2, the seat 2 is under pressure and drives the pivot shaft 3 to move downward against the acting force of the reset mechanism 32 until the pivot shaft 3 reaches a bottom of the adjustment hole 131. At this time, the rear end of the seat 2 is in a lower position, and the rear end of the seat 2 is in contact with the rear of the toilet body 7 (ceramic body). The second trigger end 31 is lowered to the lowest position/descending position, and the second trigger end 31 triggers the first trigger end 620.

The control mechanism 62 controls the drain valve pressure relief pipe 614 to discharge the water into the toilet body 7 so as to generate an unbalanced pressure in the drain valve 61. The drain valve diaphragm unseals the baffle rib 617 in the drain valve 61 in response to the unbalanced pressure. When the drain valve pressure relief pipe 614 drains outward, the water pressure in the lower water cavity 616 decreases, the drain valve diaphragm 613 leaves the baffle rib 617 downward, and the drain valve outlet pipe 612 drains.

At act S103, the hot water is discharged from the hot water inlet end 16 of the seat device into the spray pipe 4 to flush the water residual out of the spray pipe 4 when the drain valve diaphragm 613 is opened.

Specifically, as noted above, the pre-flush system 6 uses the drain valve 61 and control mechanism 62 to achieve the pre-flush function of the spray pipe 4, flushing out the cold water in the spray pipe 4 through the hot water before the user uses the spray pipe 4 and filling the spray pipe 4 with hot water. When the user uses it, the nozzle 41 directly emits hot water. When the control mechanism 62 is in the triggered state, the drain valve diaphragm 613 is in the opened state and the drain valve outlet pipe 612 supplies hot water to the spray pipe 4 to flush the cold water out of the spray pipe 4.

The above are merely the principle and the embodiments of the present disclosure. It should be pointed out that, for those having ordinary skill in the art, several other modifications may be made on the basis of the principle of the present disclosure, which should also be regarded as falling in the protection scope of the present disclosure.

I claim:

1. A seat device, comprising:
  a seat base, comprising:
    a cold water inlet end; and
    a hot water inlet end;
  a spray pipe, comprising an inlet end;
  a temperature control system configured to generate water having a predetermined temperature by mixing cold water and hot water, the temperature control system comprising:
    an inlet end connected to the cold water inlet end of the seat base and the hot water inlet end of the seat base; and
    an outlet end connected to the inlet end of the spray pipe; and
  a pre-flush system, comprising:
    an inlet end connected to the hot water inlet end or the outlet end of the temperature control system; and
    an outlet end connected to the inlet end of the spray pipe.

2. The seat device according to claim 1, wherein the inlet end of the spray pipe comprises:
  a main inlet end connected to the outlet end of the temperature control system; and
  a pre-flush inlet end connected to the outlet end of the pre-flush system.

3. The seat device according to claim 1, wherein the temperature control system further comprises:
  a temperature control system water valve, comprising:
    an inlet end; and
    an outlet end connected to the inlet end of the spray pipe; and
  a temperature control valve, comprising:
    an inlet end connected to the cold water inlet end of the seat base and the hot water inlet end of the seat base; and
    an outlet end connected to the inlet end of the temperature control system water valve.

4. The seat device according to claim 3, wherein the temperature control system water valve further comprises:
  a spray pipe conversion valve, comprising:
    an inlet; and
    an outlet connected to the inlet end of the spray pipe; and
  a water mixing valve configured to further mix the generated water and the cold water, the water mixing valve comprising:
    a hot water inlet connected to the outlet end of the temperature control valve;
    a cold water inlet connected to the cold water inlet end of the seat base; and
    an outlet connected to the inlet of the spray pipe conversion valve.

5. The seat device according to claim 4, wherein the temperature control system water valve further comprises a waterway adapter valve, and
  wherein the waterway adapter valve comprises:
    a hot water pipeline comprising:
      an inlet connected to the outlet of the temperature control valve; and
      an outlet connected to the hot water inlet of the water mixing valve; and
    a cold water pipeline comprising:
      an inlet connected to the cold water inlet end of the seat base; and
      an outlet of the cold water pipeline connected to the cold water inlet of the water mixing valve.

6. The seat device according to claim 1, wherein the pre-flush system further comprises a drain valve,
  wherein the drain valve comprises:
    a drain valve inlet pipe connected to the hot water inlet end of the seat base;

a drain valve outlet pipe connected to the inlet end of the spray pipe; and
a drain valve diaphragm configured to open and close the drain valve outlet pipe,
wherein the pre-flush system further comprises a control mechanism configured to open and close the drain valve diaphragm,
wherein when the control mechanism is in an initial state, the drain valve diaphragm is in a closed state, and
wherein when the control mechanism is in a triggered state, the drain valve diaphragm is in an opened state.

7. The seat device according to claim 6, further comprising a seat pivotably mounted on the seat base,
wherein the seat is connected to the seat base through a pivot shaft,
wherein the pivot shaft is configured to move up and down relative to the seat base,
wherein the seat device further comprises a reset mechanism disposed between the seat base and the pivot shaft and configured to drive the pivot shaft to move upward to reset,
wherein the control mechanism comprises a first trigger end,
wherein the pivot shaft comprises a second trigger end configured to trigger the first trigger end,
wherein when the seat is in an initial position, the first trigger end is in an initial state, and
wherein when the seat is in a descending position, the second trigger end triggers the first trigger end and causes the control mechanism in the triggered state.

8. The seat device according to claim 7, wherein the seat base further comprises a guide groove extending vertically and configured to guide the first trigger end to move up and down,
wherein the second trigger end is engaged with the guide groove, and
wherein the first trigger end is maintained in contact with the second trigger end and configured to be pressed down by the second trigger end to a triggered position.

9. The seat device according to claim 6, wherein the drain valve further comprises a drain valve pressure relief pipe connected to the control mechanism,
wherein when the control mechanism is in the initial state, the drain valve pressure relief pipe is in a stopping draining state, and
wherein when the control mechanism is in the triggered state, the drain valve pressure relief pipe is in a draining state.

10. The seat device according to claim 9, wherein the control mechanism comprises:
a water storage valve comprising a water storage cavity;
a water storage valve inlet pipe connected to the water storage cavity and the drain valve pressure relief pipe;
a water storage valve drain pipe connected to the water storage cavity;
an inlet control valve disposed in the water storage valve inlet pipe and configured to open and close the water storage valve inlet pipe; and
a drain control valve disposed in the water storage valve drain pipe and configured to open and close the water storage valve drain pipe,
wherein when the control mechanism is in the initial state, the inlet control valve is in a closed state and the drain control valve is in an opened state, and
wherein when the control mechanism is in the triggered state, the inlet control valve is in an opened state and the drain control valve is in a closed state.

11. The seat device according to claim 10, wherein the control mechanism further comprises a switching valve connected to the water storage valve inlet pipe and the water storage valve drain pipe,
wherein the switching valve comprises:
a switching valve housing comprising a channel; and
a switching shaft engaged with the channel and configured to alternately trigger the drain control valve and the inlet control valve,
wherein when the switching shaft is in an initial position, the switching shaft triggers the drain control valve and the drain control valve is in the opened state, and
wherein when the switching shaft is in a triggered position, the switching shaft triggers the inlet control valve and the inlet control valve is in the opened state.

12. The seat device according to claim 11, wherein the inlet control valve comprises a first slide valve and a first reset member configured to drive the first slide valve to reset to a closed state,
wherein the drain control valve comprises a second slide valve and a second reset member configured to drive the second slide valve to reset to a closed state,
wherein when the switching shaft is in the initial position, the first slide valve is in the closed state and the second slide valve is opened by the switching shaft; and
wherein when the switching shaft is in the triggered position, the second slide valve is in the closed state and the first slide valve is opened by the switching shaft.

13. The seat device according to claim 12, wherein the switching shaft comprises a first recess configured to accommodate an end portion of the first slide valve and comprises a second recess configured to accommodate an end portion of the second slide valve,
wherein the first recess and the second recess are spaced apart from each other,
wherein when the switching shaft is in the initial position, one end of the first slide valve is accommodated in the first recess and one end of the second slide valve is in contact with a circumferential surface of the switching shaft, and
wherein when the switching shaft is in the triggered position, one end of the second slide valve is accommodated in the second recess and one end of the first slide valve is in contact with the circumferential surface of the switching shaft.

14. The seat device according to claim 13, wherein the water storage valve inlet pipe comprises:
a first inlet pipe connected the drain valve pressure relief pipe and the first recess; and
a second inlet pipe connected the water storage cavity and the first recess, and
wherein the inlet control valve is disposed in the first inlet pipe or in the second inlet pipe.

15. The seat device according to claim 13, wherein the water storage valve drain pipe comprises:
a first drain pipe connected to the switching valve housing and the second recess; and
a second drain pipe connected to the water storage cavity and the second recess, and
wherein the drain control valve is disposed in the first drain pipe or in the second drain pipe.

16. The seat device according to claim 10, wherein the water storage cavity comprises a lower water storage cavity and an upper water storage cavity, wherein a partition between the lower water storage cavity and the upper water storage cavity comprises a partition through hole, wherein the water storage valve inlet pipe and the water storage valve drain pipe are connected to the lower water storage cavity, wherein a floating valve is disposed in the lower water storage cavity and configured to open and close the partition through hole, wherein a water float is disposed in the upper water storage cavity, wherein a connecting rod is connected between the floating valve and the water float passes through the partition through hole, and wherein the floating valve closes the partition through hole when water stored in the upper water storage cavity reaches a predetermined water level.

17. A toilet, comprising:
  a toilet body; and
  a seat device disposed at a rear end of the toilet body, the toilet body comprising:
    a seat base, comprising:
      a cold water inlet end; and
      a hot water inlet end;
    a spray pipe, comprising an inlet end;
    a temperature control system configured to generate water having a predetermined temperature by mixing cold water and hot water, the temperature control system comprising:
      an inlet end connected to the cold water inlet end of the seat base and the hot water inlet end of the seat base; and
      an outlet end connected to the inlet end of the spray pipe; and
    a pre-flush system, comprising:
      an inlet end connected to the hot water inlet end or the outlet end of the temperature control system; and
      an outlet end connected to the inlet end of the spray pipe.

18. A method for flushing water residual out of a spray pipe by using a seat device, comprising:
  maintaining, by a control mechanism of the seat device, a drain valve diaphragm in a closed state when the control mechanism is not triggered;
  triggering the control mechanism to open the drain valve diaphragm, in response to a pressure on a seat of the seat device generated by a user; and
  discharging hot water from a hot water inlet end of the seat device into the spray pipe to flush the water residual out of the spray pipe when the drain valve diaphragm is opened.

19. The method according to claim 18,
wherein maintaining, by the control mechanism of the seat device, the drain valve diaphragm in the closed state when the control mechanism is not triggered comprises:
  maintaining, by a rest mechanism, a first trigger end of the control mechanism spaced apart from a second trigger end of a pivot shaft,
wherein triggering the control mechanism to open the drain valve diaphragm, in response to the pressure on the seat of the seat device generated by the user comprises:
  moving the pivot shaft downwards until the second trigger end of the pivot shaft contacts the first trigger end of the control mechanism to trigger the control mechanism, in response to the pressure on the seat of the seat device generated by the user.

20. The method according to claim 19,
wherein maintaining, by the control mechanism of the seat device, the drain valve diaphragm in the closed state when the control mechanism is not triggered further comprises:
  controlling, by the control mechanism, a drain valve pressure relief pipe to stop discharging water into a toilet body so as to generate a balanced pressure in a drain valve; and
  sealing, by the drain valve diaphragm, a baffle rib in the drain valve in response to the balanced pressure, and
wherein triggering the control mechanism to open the drain valve diaphragm, in response to the pressure on the seat of the seat device generated by the user further comprises:
  controlling, by the control mechanism, the drain valve pressure relief pipe to discharge the water into the toilet body so as to generate an unbalanced pressure in the drain valve; and
  unsealing, by the drain valve diaphragm, the baffle rib in the drain valve in response to the unbalanced pressure.

* * * * *